(12) United States Patent
Inada et al.

(10) Patent No.: US 8,465,191 B2
(45) Date of Patent: Jun. 18, 2013

(54) PLANAR LIGHT EMITTING DEVICE AND METHOD OF MANUFACTURING SAME

(75) Inventors: Tomosada Inada, Sakura (JP); Shimpei Sato, Sakura (JP); Takashi Edo, Sakura (JP)

(73) Assignee: Fujikura Ltd., Tokyo (JP)

( * ) Notice: Subject to any disclaimer, the term of this patent is extended or adjusted under 35 U.S.C. 154(b) by 8 days.

(21) Appl. No.: 13/333,651

(22) Filed: Dec. 21, 2011

(65) Prior Publication Data

US 2012/0163020 A1 Jun. 28, 2012

Related U.S. Application Data

(63) Continuation of application No. PCT/JP2010/004203, filed on Jun. 24, 2010.

(30) Foreign Application Priority Data

Jun. 24, 2009 (JP) .................................. 2009-150305
Jun. 24, 2009 (JP) .................................. 2009-150306

(51) Int. Cl.
*F21V 7/04* (2006.01)

(52) U.S. Cl.
USPC ........... 362/606; 362/600; 362/615; 362/616; 362/617

(58) Field of Classification Search
None
See application file for complete search history.

(56) References Cited

U.S. PATENT DOCUMENTS

| | | | |
|---|---|---|---|
| 7,014,330 B2* | 3/2006 | Yokoyama et al. | 362/23 |
| 7,988,310 B2* | 8/2011 | Yamada et al. | 362/26 |
| 8,188,397 B2* | 5/2012 | Miyashita et al. | 200/310 |
| 2004/0109304 A1 | 6/2004 | Yokoyama et al. | |
| 2009/0154193 A1 | 6/2009 | Yamada et al. | |
| 2009/0322568 A1* | 12/2009 | Yoshida | 341/22 |

FOREIGN PATENT DOCUMENTS

| | | |
|---|---|---|
| JP | 05-053070 U | 7/1993 |
| JP | 11-237259 A | 8/1999 |
| JP | 2001-167655 A | 6/2001 |
| JP | 2004-185976 A | 7/2004 |
| JP | 2008-041431 A | 2/2008 |
| JP | 2008-152951 A | 7/2008 |
| JP | 2008-269889 A | 11/2008 |
| JP | 2009-117233 A | 5/2009 |
| JP | 2009-146653 A | 7/2009 |

* cited by examiner

*Primary Examiner* — Natalie Walford
(74) *Attorney, Agent, or Firm* — Sughrue Mion, PLLC

(57) ABSTRACT

A planar light emitting device provided with a light source; a sheet-like light guide that guides light from the light source in a planar direction, and has a plurality of light emitting regions, and a through slit formed between the light emitting regions to penetrate the light guide in a thickness direction; a switch sheet arranged so as to face one of the front face and the rear face of the light guide; and a light-blocking layer that has a flange portion that covers an opening edge portion of the through slit, a main body portion that covers at least one of the mutually facing inner wall surfaces of the through slit so as to form a space in the interior of the through slit and that continuous with the flange portion, and a bottom portion that is extended from a lower portion of the main body portion.

15 Claims, 16 Drawing Sheets

PLANAR LIGHT EMITTING DEVICE AND METHOD OF MANUFACTURING SAME

CROSS REFERENCE TO RELATED APPLICATIONS

This application is a continuation application based on a PCT Patent Application No. PCT/JP2010/004203, filed Jun. 24, 2010, whose priorities are claimed on Japanese Patent Application No. 2009-150305, filed Jun. 24, 2009, and Japanese Patent Application No. 2009-150306, filed Jun. 24, 2009, the entire contents of which are hereby incorporated by reference.

BACKGROUND OF THE INVENTION

1. Field of the Invention

The present invention relates to a planar light emitting device and a method of manufacturing thereof, in which the planar light emitting device is used for the illumination of operation buttons or key buttons of a mobile phone, a personal digital assistant (PDA), a personal computer and the like.

2. Description of the Related Art

When operating the operation buttons or key buttons of mobile phones, PDAs, and personal computers and the like in dark places, these buttons or keys are illuminated in order to make the positions of the operation buttons and key buttons easily viewable.

Conventionally, in order to brightly illuminate the key buttons of a mobile phone and the like, a planar light emitting device is used, and as one aspect of this planar light emitting device, a side surface light emitting type planar light emitting device is widely employed.

That is to say, this side surface light emitting type planar light emitting device is constituted from a light guiding plate (light guiding film) that is arranged on the back surface side of the display panel such as a liquid crystal panel, and a light source that is arranged at a side end face of this light guiding film. Also, examples of the light source that is applied to this planar light emitting device include a light emitting diode (LED), a cold-cathode tube, and the like.

As one example of this illumination device, for example, Patent Document 1 discloses a push button switch-type illumination device. As shown in FIG. 11, in this push button switch-type illumination device, a substrate 103 is arranged inside of a case that consists of an upper case 101 and a lower case 102. A keypad 105 that is provided with a plurality of operation keys 104 is provided above this substrate 103. A light guiding plate 106 is arranged between this keypad 105 and the substrate 103, and switching elements 107 corresponding to the operation keys 104 are arranged on the upper surface side of the substrate 103. The operation keys 104 of the keypad 105 are exposed to the outside via a plurality of operation holes 101a that are formed in the upper case 101. Along with that, a display device 109 such as a liquid display panel is provided at an end portion of the substrate 103. This display device 109 can be viewed from outside via a display window 101b that is formed in the upper case 101.

Then, the light guiding plate 106 provided between the substrate 103 and the keypad 105 illuminates the operation keys 104 from the rear-face side (inner side). A light source 108 is provided at one end portion of the light guiding plate 106. The light guiding plate 106 projects the light that is made incident from the light source 108 onto the light guiding plate 106 to the rear-face side of the keypad 105, and thereby illuminates the operation keys 104 from the rear-face side.

Also, as another structure example of a planar light emitting device that is provided with this light guiding plate, a plurality of the light sources 111 are arranged at the end portion side of the light guide 110, as shown in FIG. 12 and FIG. 13. A switch sheet 112 is arranged on the rear-face side (the lower-surface side in the drawing) of the light guide 110. A key mat 113 is arranged on the front-surface side (the upper-surface side in the drawing) of the light guide 110. A light extracting portion 110a that consists of a plurality of concave-convex portions (concave-convex portions) is provided at required positions of the light guide 110, and illumination light is guided to the surface side (upper-face side) of the light guide 110 via the light extracting portion 110a.

In recent years, in this kind of planar light emitting device, it has been desired to illuminate the operation keys so as to selectively cause only specified operation keys to emit light, or so as to selectively cause only specified operation keys not to emit light.

As a method of achieving this issue, for example Patent Document 2 discloses a structure that provides a light-blocking portion that consists of a non-light-transmissive resin at the light guide. That is to say, in this structure, by dividing the aforementioned light guide into a plurality of regions, providing a slit at the portion that becomes the boundary of each region, and filling the non-light-transmissive resin in the interior of the slit, the light-blocking portion that consists of the non-light-transmissive resin is provided at the boundary of each region of the light guide. In order to realize this structure, in the structure disclosed in Patent Document 2, as shown in FIG. 14A to FIG. 14D, a UV curable resin film 151 is formed by spin coat method on a carrier base 150, and after curing the resin film, a slit 152 is formed at the required position by selective etching. Thereafter, using a resin dispenser 153, a black resin 155 is filled in the slit 152, and by curing this resin 155, the light-blocking portion 156 is formed.

Also, for example Patent Document 3 discloses an illumination device that can respectively illuminate the upper portion and lower portion of a push button using only one light guide. This illumination device is provided with a light-blocking rib that has a notched portion, and a light guide body that is attached to this light-blocking rib. This light guide body is provided with a first light guide portion and a second light guide portion that illuminate the upper portion and lower portion of the push button respectively. These first and second light guide portions are integrated via a crank-shaped connection portion. By fitting the crank-shaped connection portion in the notched portion of the light-blocking rib, the light guide body is attached to the light-blocking rib. In this way, by using only one light guide body, it is possible to perform separate illumination.

Furthermore, for example Patent Document 4 (Japanese Unexamined Patent Application, First Publication No. 2008-152951) discloses a switch sheet module that can cause a plurality of key switches to emit light with fewer light emitting elements at every group. This switch sheet module is provided with a light guide sheet portion that covers the upper surface of the key switch, and the light guide sheet portion is constituted by a plurality of light conductive sheet materials of which at least one portion is overlapped, and an LED is arranged at each light conductive sheet material.

The method that is disclosed in paragraph 0034 to paragraph 0035 of Patent Document 2 (Japanese Unexamined Patent Application, First Publication No. 2008-41431) manufactures the UV-curable resin film 151 that becomes a light guide by spin coat method (as shown in FIG. 14A to FIG. 14C), and after subjecting this resin film 151 to UV curing, forms the slit 152 by selective etching. Thereafter, resin is injected into this slit 152, and by curing this resin, a hard light-blocking portion 156 is formed. Accordingly, the method according to Patent Document 2 has the problem that the manufacture requires excessive time and effort.

Also, as shown in paragraph 0036 to paragraph 0037 of Patent Document 2, even in the case of adopting a method that applies an insert formation technique, since a step that sandwiches a black, hard resin in a metal mold and flows a light guide material from both sides is required, it has the problem of requiring excessive time and effort for manufacture.

The method that is disclosed in Patent Document 2 is a method that provides the light-blocking portion 156 in the resin film 151 that is formed with the spin coat method and has a thickness of about 0.3 mm to 2 mm, and the thickness of the light-blocking portion 156 that is filled and formed in the slit 152 of the resin film 151 is 0.3 mm to 2 mm, and thus extremely thick. As shown in FIG. 5 and FIG. 6 of Patent Document 2, the light-blocking portion 156 and the resin film 151 that are integrally molded are completely bonded. Accordingly, in the case of the material that constitutes the light-blocking portion 156 differing from the material that constitutes the resin film 151, there is a possibility of the light-blocking portion 156 exfoliating by a change in the environmental temperature, due to the difference of the linear expansion coefficients of these materials. Also, by having a structure that fills in the entirety of the slit 152 with the light-blocking portion 156, the heat dissipation around the slit formation portion of the resin film 151 worsens, and so there is the possibility of discoloration occurring in the resin material that constitutes the light guide due to the working temperature environment.

Furthermore, it is conceivable to apply the technique disclosed in Patent Document 3 (Japanese Unexamined Utility Model Application, First Publication No. H05-53070) to provide a light-blocking member in a push button switch-type illumination device disclosed in Patent Document 1 (Japanese Unexamined Patent Application, First Publication No. 2001-167655). However, the field of application of the technique given in Patent Document 3 is car audio, and the structure of Patent Document 3 is therefore can be applied when there is ample space. On the other hand, in the field of mobile telephones, there is a desire to make the overall thickness as thin as possible, and so applying the technique that is disclosed in Patent Document 3 is not easily done.

SUMMARY

The present invention was achieved in view of the above circumstances, and has as its object to provide a planar light emitting device and a method of manufacture thereof that can readily realize with a simple structure segmentation of regions in the planar light emitting device so as to selectively cause only specified operation keys to emit light, or so as to selectively cause only specified operation keys not to emit light, and that can enable good thermal diffusion around the light-blocking adhesive layer so that exfoliation of the light-blocking adhesive layer is difficult even if subjected to thermal stress arising from temperature changes of the environment and repeated pressing force by operation of the key switches, and accordingly the occurrence of light leakage among regions that selectively emit light is difficult.

The present invention that resolves the aforementioned issues adopts the following constitution.

(1) The planar light emitting device according to one aspect of the present invention is provided with a light source; a sheet-like light guide that is arranged in the vicinity of the light source to guide light from the light source in a planar direction, and has a plurality of light emitting regions, and a through slit that is formed between the light emitting regions to penetrate the light guide in a thickness direction; a switch sheet that is arranged so as to face one of a front face and a rear face of the light guide; and a light-blocking layer that has a flange portion that covers an opening edge portion of the through slit, a main body portion that covers at least one of the mutually facing inner wall surfaces of the through slit so as to form a space in an interior of the through slit and that continuous with the flange portion, and a bottom portion that is extended from the lower portion of the main body portion.

(2) The bottom portion of the light-blocking layer may be formed on the front face of the switch sheet that faces the through slit.

(3) A spacer that is formed between the through slit and the switch sheet may be further provided, and the bottom portion of the light-blocking layer may be formed on the front face of the spacer that faces the through slit.

(4) The main body portion of the light-blocking layer may be formed so as to cover both of the mutually facing inner wall surfaces of the through slit; the main body portion that is formed on the inner wall surfaces of both sides may be continuous via the bottom portion of the light-blocking layer; and the space that is formed in the interior of the through slit may be a recess portion that is surrounded by the main body portion that is formed on the inner wall surface of both sides and the bottom portion of the light-blocking layer.

(5) The width of the through slit may be in a range of 0.1 mm to 1 mm.

(6) The bottom portion of the light-blocking layer may fill the space between the bottom portion of the through slit and the switch sheet or a space between the bottom portion of the through slit and the spacer that is formed on the switch sheet.

(7) The light-blocking layer may be a light-blocking layer that is formed by ink application.

(8) The light-blocking layer may be bonded to the light guide and one of the switch sheet and the spacer that is formed on the switch sheet via a hot melt layer.

(9) A method of manufacturing a planar light emitting device according to one aspect of the present invention includes: forming a through slit that penetrates a light guide in a thickness direction of the light guide; affixing a switch sheet to one side among a front face and a rear face of the light guide; and forming a light-blocking layer so as to be formed continuously over the opening edge portion of the through slit of the light guide and at least one of the mutually facing inner wall surfaces of the through slit, and so as to be further extended from the lower portion of the inner wall surface, while leaving a space in the interior of the through slit.

(10) The light-blocking layer may be formed by applying ink of a light-blocking material on the inside of the through slit with a dispenser from the outside of the opening portion of the through slit so as to extend over the opening edge portion of the through slit of the light guide, the inner wall surface, and the front face of the switch sheet that is near the inner wall surface.

(11) The switch sheet may be affixed to the light guide by inserting a spacer between the bottom portion of the through slit and the switch sheet; and the light-blocking layer may be formed by applying ink of a light-blocking material on the inside of the through slit with a dispenser from the outside of the opening portion of the through slit so as to extend over the opening edge portion of the through slit of the light guide, the inner wall surface, and the front face of the spacer that is near the inner wall surface.

(12) A light-blocking adhesive material that has a hot melt layer and a light-blocking layer may be arranged at the opening portion of the through slit; and the light-blocking layer may be formed by pushing in the light-blocking adhesive material while causing it to thermally deform from the outside of the opening portion using a hot press jig that has a convex portion corresponding to the width and depth of the through slit, and bonding the hot melt layer to the opening edge portion of the through slit of the light guide and the switch sheet.

(13) The switch sheet may be affixed to the light guide by inserting a spacer between the bottom portion of the through slit and the switch sheet; a light-blocking adhesive material that has a hot melt layer and a light-blocking layer may be arranged at the opening portion of the through slit of the light guide; and the light-blocking layer may be formed by pushing in the light-blocking adhesive material while causing it to thermally deform from the outside of the opening portion using a hot press jig that has a convex portion corresponding to the width and depth of the through slit to bond the hot melt layer to the opening edge portion of the through slit of the light guide and the spacer that is formed on the switch sheet.

(14) The hot press jig may be provided with an auxiliary pressing portion on both sides in the width direction of the convex portion; and a flange portion of the light-blocking layer that covers the opening edge portion of the through slit may be formed by pressing the light-blocking adhesive material that is positioned at the opening edge portion of the through slit with the auxiliary pressing portions in a state of the convex portion being inserted in the through slit.

(15) The light-blocking layer may be formed so as to cover both of the mutually facing inner wall surfaces of the through slit; the light-blocking layer that covers both the inner wall surfaces may be formed so as to be continuous by the light-blocking layer that is further extended from the lower portion of the inner wall surfaces; and a recess portion may be formed with the light-blocking layer that covers both of the inner wall surfaces that are continuous via the light-blocking layer that is further extended from the lower portion of the inner wall surfaces.

In the planar light emitting device according to one aspect of the present invention, the light-blocking layer covers the opening edge portion of the through slit, and successively covers the inner wall surfaces of the through slit. Moreover, since the light-blocking layer is provided with a bottom portion that is extended from the lower portion of the inner wall surfaces, it is possible to provide a structure in which light leakage hardly occurs to an adjacent region via the through slit. Also, it is possible to prevent light leakage to the outside of the light guide from the through slit.

Also, since the light-blocking layer is provided with a space in the interior of the through slit, it is possible to provide a structure with good heat dissipation by prevent heat from building up around the formation position of the light-blocking layer, and it is possible to provide a structure in which there is little risk of discoloring or heat degradation in the light guide around the through slit portion. Moreover, with this structure, even if the light guide undergoes repeated thermal contraction and thermal expansion so as to narrow or widen the width of the through slit due to repeated thermal expansion of the light guide, causing repetitive stress to act on the light-blocking layer, since the light-blocking layer can readily deform in a direction that narrows or widens the space, it becomes a structure that is advantageous for stress cushioning.

According to the manufacturing method of the aspect of the present invention, it is possible to easily obtain a planar light emitting device that exhibits the aforementioned superior working effect.

DETAILED DESCRIPTION OF THE EMBODIMENTS

Herein below, the planar light emitting device according to the embodiments of the present invention shall be described.

The following embodiments shall be described in detail in order to allow better understanding of the gist of the present invention, and unless otherwise specified, will not serve to limit the present invention.

First Embodiment

Figure 1A:
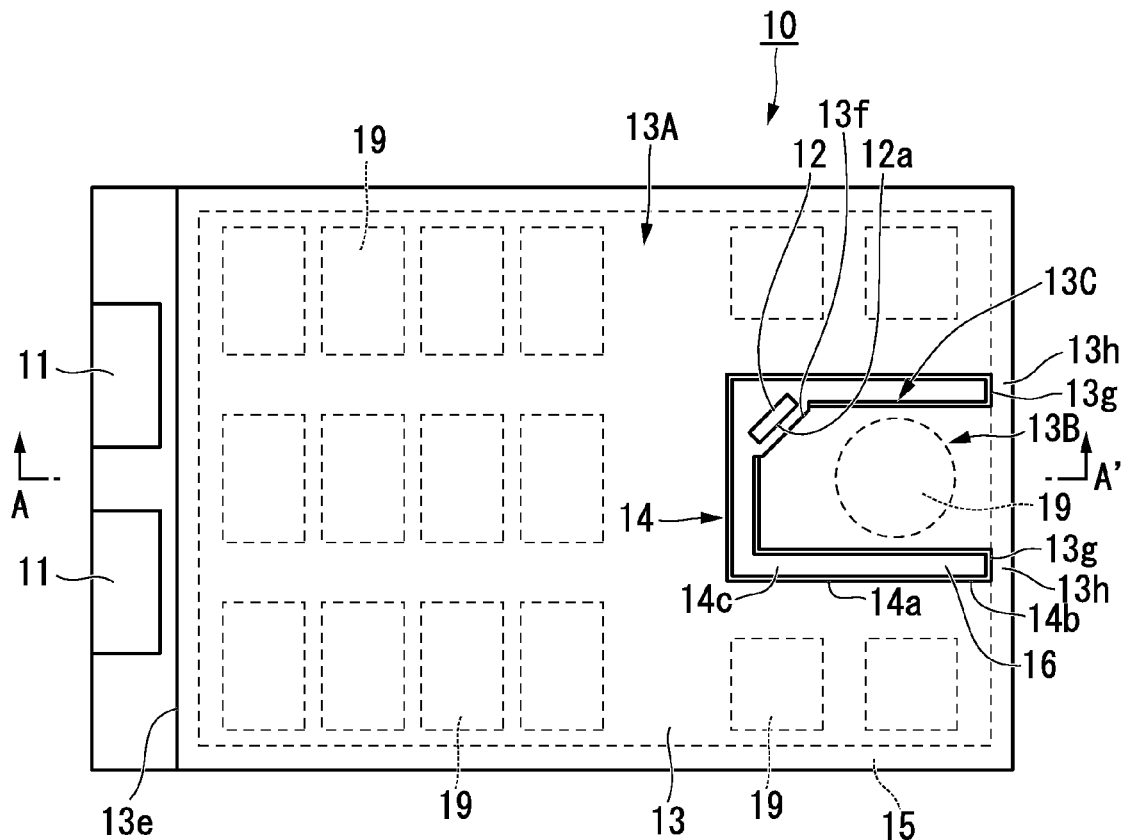
FIG. 1A is a plan view that shows an outline of a planar light emitting device according to the first embodiment of the present invention.
Figure 1B:
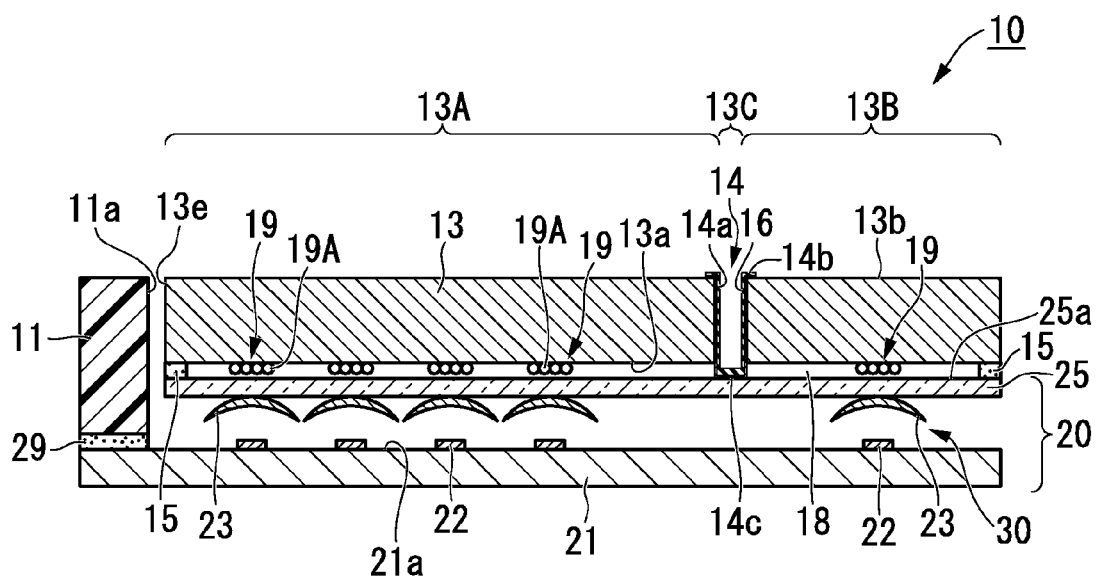
FIG. 1B is a cross-sectional view along line A-A' in FIG. 1A.
Figure 2A:
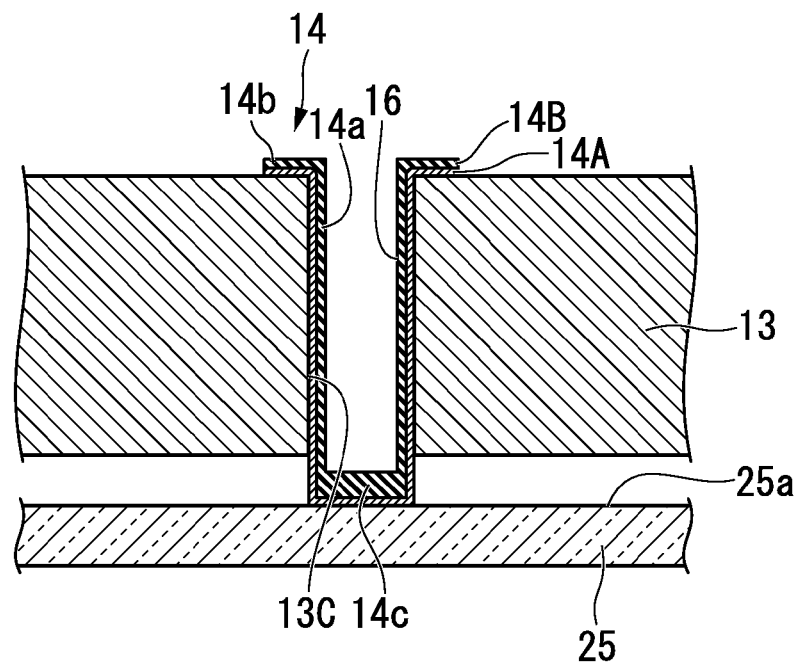
FIG. 2A is an enlarged cross-sectional view of a through slit portion of the planar light emitting device shown in FIG. 1B.
Figure 2B:
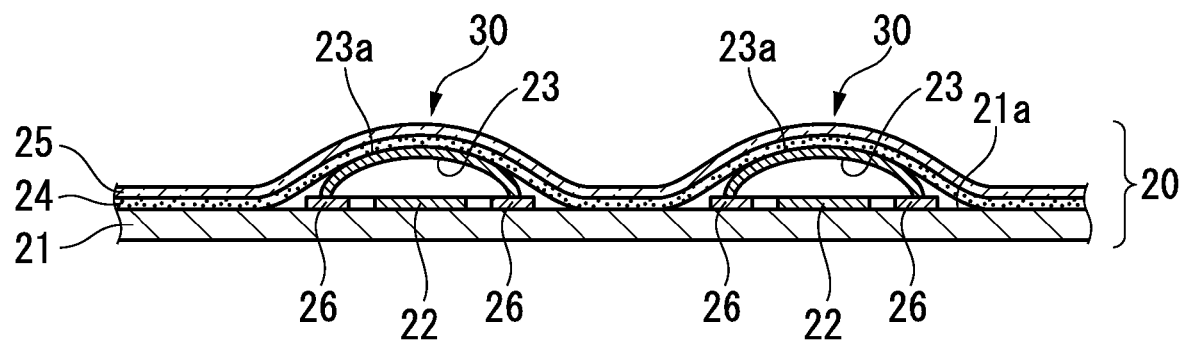
FIG. 2B is a cross-sectional view that shows a structure example of the switch sheet that is incorporated in the planar light emitting device shown in FIG. 1B.

FIG. 1A to FIG. 2B are outline drawings that show the planar light emitting device according to the first embodiment of the present invention. Among them, FIG. 1A is a plan view, FIG. 1B is a cross-sectional view along line A-A' of FIG. 1A, FIG. 2A is a partial enlarged view of the planar light emitting device shown in FIG. 1B, and FIG. 2B is a partial cross-sectional view of a switch sheet that is incorporated in the same planar light emitting device.

As shown in FIG. 1A and FIG. 1B, the planar light emitting device 10 of the present embodiment is provided with two first light sources 11 and 11, one second light source 12, a sheet-like light guide 13 that is arranged in the vicinity of the exit face 11a of the first light source 11, and a switch sheet 20 that is arranged on one surface (rear surface, lower surface) 13a side of the light guide 13. This light guide 13 has a rectangular shape in the plan view of FIG. 1A. Note that in the present embodiment, two first light sources and one second light source are provided, but it is not limited thereto, and for example one first light source can be provided as necessary.

As shown in FIG. 1B, the switch sheet 20 is bonded to the light guide 13 via a first adhesive material (a first spacer) 15 that is provided in a frame shape at the periphery of the one surface (rear surface, lower surface) 13a of the light guide 13. Due to this structure, a gap 18 is provided between the light guide 13 and the switch sheet 20. That is to say, the light guide 13 and the switch sheet 20 are not in contact, but rather the light guide 13 and the switch sheet 20 are oppositely arranged spaced apart by the gap 18 in accordance with the thickness of the first adhesive material 15. This first adhesive material 15 is provided in a rectangular shape along the outer periphery of the light guide 13, as shown by the dotted line in FIG. 1A.

An adhesive that retains its own shape is used as the first adhesive material 15. Examples of such an adhesive include acrylic resin, polyurethane resin, epoxy resin, urethane resin, natural rubber adhesive, synthetic rubber adhesive, or a double-sided adhesive tape in which these resins or adhesives are coated on both sides of a backing material that consists of resin or paper.

The thickness of the gap 18 that is provided between the light guide 13 and the switch sheet 20, that is, the distance between the light guide 13 and the switch sheet 20 (in other words, the thickness of the first adhesive material 15) is not particularly limited, and it is sufficient for the light guide 13 and the switch sheet 20 not to make contact in the situation of the planar light emitting device 10 being used. In order to make the overall planar light emitting device 10 thinner, the distance between the light guide 13 and the switch sheet 20 is approximately 0.01 mm to 0.05 mm, and for example more than or equal to 0.03 mm and less than or equal to 0.05 mm is preferred.

The light guide 13 according to the present embodiment is partitioned into two regions. That is to say, as shown in FIG. 1A and FIG. 1B, the light guide 13 is partitioned into a first region 13A and a second region 13B. A through slit 13C having a U-shape in plan view that penetrates the light guide 13 in the thickness direction is provided at the boundary portion between the first region 13A and the second region 13B. That is to say, as shown in FIG. 1A, the through slit 13C forms a U-shape in plan view. Moreover, as shown in FIG. 1B, this through slit 13C penetrates in the thickness direction of the light guide 13.

In the planar light emitting device 10 of this first embodiment, as shown in FIG. 1A, in the case of the end portion of the light guide 13 of the side adjacent to the first light sources 11 being a first end portion, and the end portion of the light guide 13 on the opposite side of this first end portion being a second end portion, both ends 13g of the U-shaped through slit 13C are arranged near the edge of the light guide 13 in the middle of the second end portion.

In the light guide 13, the first region 13A and the second region 13B are connected by a bridge portion 13h that is adjacent to both ends 13g of the U-shaped through slit 13C. The width of the bridge portion 13h is about the same as the width of the first adhesive material 15. Thereby, the wrapping around of light between the first region 13A and the second region 13B via this portion is restricted to a minimum. In FIG. 1A and FIG. 1B, the first adhesive material 15 is provided in a rectangular shape along the outer periphery of the light guide 13 as shown by the dotted line in FIG. 1A, but it is not limited thereto. Moreover, the first adhesive material 15 may also be provided along the U-shape at the outer periphery of the second region 13B of the light guide 13. Furthermore, the first adhesive material 15 may also be provided along the U-shape at the inner periphery of the first region 13A of the light guide 13 corresponding to the second region 13B. These first adhesive materials 15 are preferably the same thickness.

The structure of the present embodiment is a structure that provides the bridge portion 13h at both end sides of the through slit 13C. However, it is also acceptable to adopt a constitution that omits the bridge portion 13h and brings the through slit 13C all the way to the end portion of the light guide 13. That is to say, in the present embodiment, the first region 13A and the second region 13B are connected by the bridge portion 13h so as not to be completely independent. However, the present embodiment is not limited thereto, and it is possible for the first region 13A and the second region 13B to be two completely independent pieces that are not connected.

In the case of the first region 13A and the second region 13B being independent, it is possible to make a structure that provides the first adhesive material 15 to be extended to the periphery of the through slit 13C, and individually fixes and bonds the first region 13A and the second region 13B of the light guide 13 onto the switch sheet 20 using the first adhesive material 15. That is to say, it is possible to provide the first adhesive material 15 along the U-shape of the through slit 13C at the outer periphery of the second region 13B and the inner periphery of the first region 13A.

Also, as shown in FIG. 1A, one end portion (free end) 13f of the second region 13B of the light guide 13 is formed so as to be diagonally cut away in the case of viewing the light guide 13 in plan view. The second light source 12 such as an LED is arranged on the switch sheet 20 at the outside of the one end portion 13f and within the through slit 13C so as to face the one end portion 13f. This second light source 12 can individually make light incident on the second region 13B via the one end portion 13f of the light guide 13.

Note that in the U-shaped through slit 13C seen in plan view in FIG. 1A, a light-blocking adhesive layer 14 described below is omitted at the one end portion 13f for making light incident from the second light source 12 to the second region 13B. That is to say, it is possible to introduce light from the second light source 12 to the second region 13B of the light guide 13 via the one end portion 13f at which the light-blocking adhesive layer 14 is not formed.

The light guide 13 according to the present embodiment consists of a sheet-shaped resin, and for example has a rectangular shape in plan view.

The resin that constitutes the light guide 13 it is not particularly limited, provided it is a light transmissive resin and an elastically deformable resin, and any one chosen from the group consisting of polyurethane resin, polycarbonate resin, silicone resin, polystyrene resin, polyimide resin, an elastomer of polymethyl methacrylate (PMMA), and urethane acrylate is used.

Among these resins, a resin that has a moderate rigidity is preferred in order to maintain a constant width of the gap 18 that is provided between the light guide 13 and the switch sheet 20, that is, so that the light guide 13 and the switch sheet 20 do not make contact. Specifically, polyurethane resin, silicone resin, or polycarbonate resin is preferable.

Moreover, since polyurethane resin and silicone resin have elasticity, the upper surface of the light guide 13 that consists of these resins is difficult to damage, and has a nice feel when pressing the switch element 30, described later, that is provided on the switch sheet 20. Also, a polycarbonate resin has a characteristic of having high light transmission even when the thickness is thin.

The thickness of the light guide 13 is not particularly limited, and the thickness of the light guide 13 can be set such that the transmission of the outgoing light from the first light sources 11 and the second light source 12 is high, and in the case of the operator pressing a necessary position of the light guide 13 with an operating device such as a fingertip or a pen, the operating device can perform input to the switch element 30 of the switch sheet 20, and on the other hand in the case of not pressing the switch element 30 of the switch sheet 20, can constantly maintain the width of the gap 18 that is provided between the light guide 13 and the switch sheet 20 (that is to say, can ensure that the light guide 13 and the switch sheet 20 do not make contact). The thickness of the light guide 13 is 0.05 mm to 0.3 mm and preferably for example more than or equal to 0.1 mm and less than or equal to 0.2 mm in order to make the planar light emitting device 10 thinner.

Then, a light-blocking adhesive layer 14 that is formed by a hot press process is provided on the inner surface side of the through slit 13C of the light guide 13. As shown in FIG. 1B, the light-blocking adhesive layer 14 is formed along the inner wall surface of the through slit 13C having a U-shape in plan view so as to cover the entire inner wall surface thereof, except for the one end portion 13f that faces the second light source 12 as shown in FIG. 1A. That is to say, this light-blocking adhesive layer 14 consists of a main body portion 14a, a flange portion 14b, and a bottom portion (base portion) 14c, and is formed in an approximate U-shape in transverse section. The main body portion 14a is continued to the flange portion 14b, and the bottom portion 14c is provided in an extended manner from the lower portion of the main body portion 14a. Among these, the main body portion 14a adheres to the inner wall surface of the through slit 13C, and covers the through slit 13C. The flange portion 14b is formed extending to the upper portion side of the main body portion 14a, and covers the upper surface opening edge portion of the through slit 13C by a predetermined width. The bottom portion (base portion) 14c is formed to project from the bottom surface of the light guide 13 at the lower portion side (switch sheet 20 side) of the main body portion 14a, adhere to the upper surface (one surface) of the switch sheet 20, and fill the gap between the bottom portion of the through lit 13C and the light guide 13. That is to say, the bottom portion 14c covers the space of the bottom portion of the through slit 13C until the switch sheet 20.

Since the light-blocking layer 14 is formed to be thinner than the width of the through slit 13C, and is formed so as to cover the entire inner wall surface of the through slit 13C, a groove-type recess portion (concave portion) 16 is formed between the mutually facing main body portions 14a, 14a at the inner side of the through slit 13C. That is to say, the light-blocking adhesive layer 14 is formed in a state of a space (recess portion) being left on the interior side (inner side) of the through slit 13C.

As shown in FIG. 2A, the light-blocking adhesive layer 14 of the present embodiment has a two-layer structure that consists of a hot melt layer 14A that is arranged on the inner wall surface side of the through slit 13C and on the upper surface side of the switch sheet 20, and a light-blocking layer 14B that is laminated to the hot melt layer 14A. As shown in FIG. 2A, the light-blocking layer 14B is provided with a flange portion that covers the opening edge portion of the through slit 13C, a main body portion that is connected to this flange portion and that covers the inner wall surface of the through slit 13C, and a bottom portion that is provided in an extended manner from the lower portion of the main body portion. In the present embodiment, unless particularly limited, the light-blocking layer 14B and the light-blocking adhesive layer 14 have the same structure.

The hot melt layer 14A is a layer that consists of a hot melt adhesive that has a solid form in its initial state, but softens by heating to become flowable, and then hardens to have an adhering performance by subsequent cooling.

As a hot melt adhesive that can be applied as the hot melt layer 14A, it is possible to use an ethylene-vinyl acetate resin hot melt adhesive, a polyamide resin hot melt adhesive, a polyurethane resin hot melt adhesive, a polyolefin resin hot melt adhesive, a styrene resin hot melt adhesive, and the like.

The hot melt layer 14A is formed by using a layer that consists of the aforementioned hot melt adhesive, causing the layer to thermally deform along the through slit 13C by a hot press process that will be described later to expand into a shape conforming to the through slit 13C, and then cooling to bond and harden the layer.

Note that the hot melt adhesive generally has a slightly viscous tackiness at room temperature, which is advantageous for temporarily installation on the surface of the light guide 13 at room temperature, and thus has the characteristic of temporary positioning of a light-blocking adhesive material for forming the light-blocking adhesive layer 14 being easy when using the hot press process described later.

The light-blocking layer 14B consists of a resin with a softening point that is near that of the hot melt layer 14A, and consists of a light-blocking resin material with a black color or a dark color having a high light blocking effect, such as black PET (black inorganic particles, such as carbon black, blended with polyethylene terephthalate resin), black urethane, polyethylene naphthalate (PEN), and polymethyl methacrylate resin (PMMA).

Note that in the present invention, since the light-blocking resin material that constitutes the light-blocking layer 14B should block light, in addition to a black resin or a dark resin having a high light-blocking performance as mentioned above, a structure that includes a material with light reflectivity is one type of resin with a light blocking effect of the present embodiment. For example, the light-blocking layer 14B made of resin having light reflectivity that includes a filler that has light reflecting properties may be applied as a light-blocking layer.

Here, examples of the respective dimensions such as the thickness and width of the through slit 13C and the light-blocking adhesive layer 14 shall be described.

Given the object of applying the through slit 13C to a planar light emitting device that is provided with a switch sheet compatible with a thin electronic device, the width of the through slit 13C that is applied to the planar light emitting device 10 of the present embodiment is preferably less than or equal to 1 mm, and more preferably more than or equal to 0.1 mm and less than or equal to 1 mm or less, and for example can be formed in a range of 0.3 mm to 0.4 mm. When the width of the through slit 13C exceeds 1 mm, the through slit width with respect to the totality becomes too large, which is not preferable.

Also, in the light-blocking adhesive layer 14, the length (the length along the width direction of the through slit 13C) of the flange portion 14b that covers the upper surface opening edge portion of the through slit 13C by a predetermined width can be formed to be 0.05 mm to 0.5 mm, for example, around 0.1 mm. When the length of the flange portion 14b is less than 0.05 mm, the adhesiveness is not sufficient, and when it is greater than 0.5 mm, it becomes too long and there is the possibility of it having an adverse effect on other members.

Furthermore, the thickness of the light-blocking adhesive layer 14 may be suitably changed in accordance with the width of the through slit 13C, but in any case it is necessary to leave a space on the inner side of the through slit 13C equivalent to a thickness that does not entirely fill the through slit 13C over the width direction thereof. Accordingly, the hot melt layer 14A and the light-blocking layer 14B that constitute the light-blocking adhesive layer 14 are formed with a thickness of 10 μm to 250 μm, for example, approximately 25 μm. When the thickness is less than 10 μm, the adhesiveness and light blocking performance are not sufficient, and when the thickness exceeds 250 μm, the through slit 13C ends up being filled in, and there is a possibility of the space on the inner side of the through slit 13C being eliminated.

Accordingly, the light-blocking adhesive layer 14 forms the recess portion 16 so as to leave a space at the inner side of the through slit 13C without covering the entire through slit 13C, and is formed so as to cover the opening edge portion and the inner wall surface of the through slit 13C, and cover the gap between the bottom portion of the through slit 13C and the upper surface of the switch sheet 20. That is to say, the light-blocking adhesive layer 14 is formed in a U-shape that has the recess portion 16, with the bottom portion of the U-shape inserted in the through slit 13C from the bottom portion of the U-shape until making contact with the upper surface of the switch sheet 20.

Next, the light-extracting portion 19 that is formed on one surface (the surface on the switch sheet 20 side) 13a of the light guide 13 adopts a structure such as forming a concave-convex portion 19A at the necessary region of the one surface 13a of a resin sheet that constitutes the light guide 13. At the region where the concave-convex portion 19A is formed, light leaks out from the interior of the light guide 13 to the one surface 13a of the light guide 13.

The plurality of light-extracting portions 19 that are formed on the one surface 13a side of the light guide 13 are aligned in plan view with a plurality of pressure-sensitive switch elements 30 that are incorporated in the switch sheet 20. That is to say, as shown in FIG. 1B, the light-extracting portions 19 are respectively arranged so as to be vertically opposite a metal plate 23 of the switch element 30, however, these installation positions need not be in complete agreement in the vertical orientation, and may be at a position that is slightly shifted in plan view.

As shown in FIG. 1A and FIG. 2B, in the switch sheet 20 that is applied in the present embodiment, a plurality of contact members 22 are provided at a predetermined interval on the one surface (hereinbelow referred to as the upper surface) 21a of the substrate 21 that faces the light guide 13. The metal plate 23 with a dome shape is provided so as to cover each contact member 22 that is positioned nearly at the center. Furthermore, a pressing sheet 25 is provided via an adhesive layer 24 so as to cover these dome shape metal plates 23.

In greater detail, as shown in FIG. 2B, the plurality of contact members 22, which consist of an electrically conductive material, are provided at a predetermined interval on the upper surface 21a of the substrate 21 that consists of a printed wiring substrate such as a PCB (printed circuit board) or an FPC (flexible printed circuit), and this predetermined interval can be set in accordance with the arrangement positions and dimensions of the key buttons that are to be illuminated. An annular contact member 26 that consists of an electrically conductive material is provided at the surrounding area of each contact member 22. The dome shaped metal plate 23 for switching between conduction and non-conduction of the contact member 22 and the contact member 26 is provided so as to cover the contact member 22 and the contact member 26.

This metal plate 23 is provided with flexibility that enables it to connect and disconnect with the contact member 22, and constitutes a bowl-shaped metal dome that has a convex shape on the opposite side of the upper surface 21a of the substrate 21. That is to say, the metal plate 23 is an arch-shaped flexible plate that projects upward in the cross-sectional view of FIG. 2B, and curves downward when an external force is applied, and recovers to the original shape via its flexibility when the external force is removed. More specifically, when for example an operator pushes the center of the upper surface 23a of the metal plate 23 by an operating device such as a fingertip, the center of the upper surface 23a of the metal plate 23 deforms so as to bend toward the upper surface 21a side of the substrate 21. Thereby, the metal plate 23 abuts the contact member 22, and the contact member 22 and the contact member 26 conduct.

Accordingly, a single pressure-sensitive switch element 30 is constituted on the switch sheet 20 by the contact member 22 that is provided on the upper surface 21a of the substrate 21, the contact member 26 that is provided around the contact member 22, the metal plate 23 that is provided so as to cover the contact member 22 and the contact member 26, and the pressing sheet 25 that covers these metal plates 23. A plurality of such switch elements 30 is provided on the substrate 21.

Also, the position of the metal plate 23 is held by the adhesive layer 24 that is formed on the rear surface side (substrate 21 side) of the pressing sheet 25.

As the first light source 11 and the second light source 12, one that consists of a light emitting element such as a light emitting diode (LED) or a luminous body such as a cold-cathode tube is used. In the case of the first light source 11 and the second light source 12 consisting of an LED, the light emitting element chip is housed in a box-shaped case, and it is constituted so as to be able to emit the light that this light emitting element chip has emitted from an exit face 11a on the case side surface of the first light source 11, or from an exit face 12a on the case side surface of the second light source 12.

Also, the first light source 11 is connected to an electrical circuit, not illustrated, on the substrate 21 by solder 29. Similarly, the second light source 12 is connected to another electrical circuit on the substrate 21 by solder (not illustrated).

In the first region 13A of the light guide 13, when the outgoing light from the first light sources 11 and 11 is made incident on the one end surface 13e that is adjacent to the first light sources, the incident light propagates through the interior of the light guide 13 while repeatedly reflecting between the one surface (rear surface) 13a and the other surface (front surface) 13b of the light guide 13. When the concave-convex portions and the like are formed at the required regions of the one surface 13a of the light guide 13, the light that propagates through the interior leaks out from the concave-convex portions. Thereby, it is possible to emit light from the light extracting portion 19 of the light guide 13 to the outside, and it is possible to visually confirm this light from the outside of the light guide 13 through the light guide 13. That is, it is possible to emit light from the light extracting portion 19 and visually confirm this light from the outside via the light guide 13 by light that propagates through the interior of the light guide 13.

Similarly, in the second region 13B of the light guide 13, when the outgoing light from the second light source 12 is made incident on the one end portion 13f thereof, the incident light propagates through the interior of the light guide 13 while repeatedly reflecting between the one surface (rear surface) 13a and the other surface (front surface) 13b of the light guide 13. It is possible to emit the light from the light extracting portion 19 that is provided at the one surface 13a of the light guide 13 to the outside, and visually confirm the light from the outside via the light guide 13.

The concave-convex portion 19A that constitutes the light extracting portion 19 can be constituted from micro dots that are formed on the one surface 13a of the light guide 13 by for example a printing method such as a screen printing method, a gravure printing method, a pad printing method, or the like. However, the concave-convex portion 19A is not limited only to the micro dots, and may also be a structure that forms the concave-convex portion by a method such as etching on the one surface 13a of the light guide 13.

In the planar light emitting device 10 of the present embodiment, when the position of the light extracting portion 19 of the light guide 13 is pressed by an operating device such as a fingertip or a pen by an operator, since the operating device causes the metal plate 23 to bend downward and deform, the center of the metal plate 23 abuts the contact member 22, and it is possible to cause the contact member 22 to conduct with the contact member 26.

Accordingly, according to the planar light emitting device 10 of the present embodiment, it is possible to perform position display of the switch portion where the metal plate 23 is provided by the leak light from each light extracting portion 19. In addition, by pressing the light extracting portion 19 with an operating device such as a pen or a fingertip to cause the metal plate 23 to deform, and switching the conduction of the contact member 22 and the contact member 26, it is possible to perform an ON/OFF (conduction and non-conduction) operation of each switch element 30.

The light guide 13 of the planar light emitting device 10 of the present embodiment is segmented into the first region 13A and the second region 13B, and the through slit 13C is provided between these two regions, with the light-blocking adhesive layer 14 being arranged within the through slit 13C. Accordingly, in the first region 13A of the light guide 13, when the outgoing light from the first light sources 11 and 11 is made incident on the one end face 13e of the light guide 13, it is possible to cause light to be emitted only through the light-extracting portions 19 that are provided at the first region 13A with that incident light, and there is no light emission through the light-extracting portion 19 that is provided at the second region 13B by that incident light. Also, in the second region 13B of the light guide 13, when the outgoing light from the second light source 12 is made incident on the one end portion 13f thereof, it is possible to cause only the light-extracting portion 19 that is provided at the second region 13B to emit light by that incident light, and there is no light emission through the light-extracting portions 19 that are provided at the first region 13A by that incident light.

That is to say, according to the structure of the present embodiment, since the opening edge portion of the through slit 13C of the light guide 13 is covered by the flange portion 14b of the light-blocking adhesive layer 14 (flange portion of the light-blocking layer), the inner wall surface of the through slit 13C is covered by the main body portion 14a of the light-blocking adhesive layer 14 (main body portion of the light-blocking layer), and the portion of the gap between the bottom portion of the through slit 13C and the switch sheet 20 is covered by the bottom portion 14c of the light-blocking adhesive layer 14 (bottom portion of the light-blocking layer), there is no leakage of light to the sides of other regions via the through slit 13C of the light guide 13.

Also, since the light-blocking adhesive layer 14 adheres to the opening edge portion of the through slit 13C and the upper surface of the switch sheet 20 (upper surface of the pressing sheet 25) by the hot melt layer 14A, it is possible to firmly bond the light-blocking adhesive layer 14 to both the light guide 13 and the switch sheet 20, and even if thermal stress is repeatedly received due to the installation environment, and even if a repeated pressing force is received due to the switch operation on the switch sheet 20, there is little risk of the light-blocking adhesive layer 14 exfoliating from the light guide 13 or the switch sheet 20. In addition, since the hot melt layer 14A can be readily press fitted and bonded to the through slit 13C portion by a hot press process using a heating and pressing jig such as a hot press jig described later, it is possible to carry out the structure of the present embodiment extremely easily.

Next, since the light-blocking adhesive layer 14 is provided with at least the two layers of the hot melt layer 14A and the light-blocking layer 14B, the hot melt layer 14A is furnished with a strong adhesive force, and the light-blocking layer 14B has an excellent light-blocking performance, and thus it is possible to divide functions between the layers. Accordingly, using the light-blocking adhesive layer 14 that satisfies both the adhesive force and light-blocking performance at a sufficiently high level, it is possible to achieve a structure that covers the through slit 13C. However, the present embodiment is not limited only to this, and for example by blending a black filler or additive with the hot melt layer, it is possible to provide a light-blocking performance to the hot melt layer itself. In the case of such a structure, it is preferable to ensure that the adhesive force of the hot melt layer itself does not drop excessively.

Furthermore, when the bottom portion 14c of the light-blocking adhesive layer 14 (bottom portion of the light-blocking layer) is provided so as to fill the gap between the bottom portion of the through slit 13C of the light guide 13 and the switch sheet 20, since the light-blocking adhesive layer 14 closes the gap between the bottom portion of the through slit and the switch sheet 20, it is possible to inhibit the entry of dust to the switch sheet 20 side via the through slit 13C. Accordingly, it is possible to prevent the mixing of foreign matter to the switch sheet 20 side, and it is possible to provide the planar light emitting device 10 with excellent dust control and waterproof performance. Thereby, even in the case of the planar light emitting device 10 of the present embodiment being used over a long period, it is possible to prevent the infiltration of dust to the switch sheet 20 side, and it is possible to prevent malfunctioning of the switch sheet.

Accordingly, it is possible to provide the planar light emitting device 10 with high dust control and waterproof performance that has a simple structure and is provided with a light-blocking structure that has a superior effect of preventing the leakage of light to adjacent regions by segmenting the light guide 13 into regions, has excellent adhesive strength, and can endure thermal stress due to changes in the environmental temperature and repeated pressing force.

Next, a structure is made in which the light-blocking adhesive layer 14 is formed over the facing inner wall surfaces of the through slit 13C of the light guide 13 and the upper surface of the switch sheet 20 that is close to them (the upper surface of the pressing sheet 25), and the recess portion 16 is formed on the inside of the through slit 13C. By such a structure, even if the light guide 13 undergoes repeated thermal contraction and thermal expansion so as to narrow or widen the width of the through slit 13C by repetition of thermal expansion of the light guide 13, and as a result repeated thermal stress is made to act on the light-blocking adhesive layer 14, since it is possible for the light-blocking adhesive layer 14 to easily deform in a manner following the direction of narrowing or widening the recess portion 16, it is a structure that is favorable for stress buffering. For this reason, it is possible to provide a structure in which there is no risk of the light-blocking adhesive layer 14 exfoliating from the through slit 13C.

Also, the switch sheet 20 is arranged facing the light guide 13 via the first adhesive material 15 that is provided on the one surface 13a of the sheet-like light guide 13, and the slight gap 18 is provided between the light guide 13 and the switch sheet 20. Thereby, it is possible to provide a structure in which the light guide 13 and the switch sheet 20 are not in close contact. That is to say, the one surface 13a and the other surface 13b of the light guide 13 are in contact with an air layer and not attached to another member that consists of resin. With such a structure, at the first region 13A of the light guide 13, when outgoing light from the first light source 11 is made incident on the one end face 13e of the light guide 13, the incident light reliably propagates through the interior of the light guide 13 while reflecting between the one surface 13a and the other surface 13b of the light guide 13, and the proportion of light that leaks out at portions other than the light-extracting portion 19 is low.

Therefore, since the light that is made incident on the light guide 13 from the first light source 11 is emitted to the outside of the light guide 13 centered on the light-extracting portion 19, the attenuation-amount of the light that propagates through the light guide 13 is restricted to a minimum during the propagation. Accordingly, it is possible to guide a sufficient quantity of light in order to produce luminescence through the light-extracting portion 19, over the entire length of the light guide 13. Similarly, in the second region 13B of the light guide 13, since the outgoing light from the second light source 12 is made incident on the one end portion 13f, the attenuation of the light that propagates through the light guide 13 is restricted to a minimum during the propagation. Accordingly, it is possible to guide a sufficient quantity of light in order to produce luminescence through the light-extracting portion 19, over the entire length of the second region 13B of the light guide 13.

Note that in the structure of the present embodiment a structure was adopted that provided the slight gap 18 between the light guide 13 and the switch sheet 20 using the first adhesive material 15. However, a structure is also possible that bonds the light guide 13 and the switch sheet 20, omitting the adhesive material 15.

Note that in the present embodiment, the planar light emitting device 10 is illustrated in which the light guide 13 is segmented into the first region 13A and the second region 13B, the through slit 13C that penetrates the light guide 13 in the thickness direction is provided between the first region 13A and the second region 13B, and moreover the light-blocking adhesive layer 14 is provided covering the inner wall surfaces of the through slit 13C. However, the planar light emitting device of the present invention is not limited thereto. In the planar light emitting device of the present invention, the light guide may be segmented into three or more regions with arbitrary shapes, and the shape of the through slit that is provided between the regions can be suitably adjusted in accordance with the shapes of the respective regions. Similarly, the shape of the light-blocking adhesive layer that is arranged in the through slit can be suitably adjusted in accordance with the shape of the through slit.

Also, the present embodiment illustrated the planar light emitting device 10 provided with the first light sources 11 that correspond to the first region 13A, and the second light source 12 that corresponds to the second region 13B, but the planar light emitting device of the present invention is not limited thereto. In accordance with the regions of the light guide that is segmented into a plurality, light sources that correspond to each region can be provided.

Next, in the present embodiment, the planar light emitting device 10 is illustrated in which the light-extracting portion 19 consisting of the concave-convex portion 19A is provided at the one surface 13a of the light guide 13. However, the planar light emitting device of the present invention is not limited thereto. In the planar light emitting device of the present invention, the light-extracting portion consisting of a concave-convex portion may be provided at the other surface 13b of the light guide.

Note that in the present embodiment, the flange portion 14b and the main body portion 14a of the light-blocking adhesive layer 14 are formed over all of the opening edge portions and the inner wall surfaces of the through slit 13C, excepting the one end portion (free end) 13f of the second region 13B of the light guide 13. That is to say, in the cross-sectional view of FIG. 2A, the main body portion 14a and the flange portion 14b of the light-blocking adhesive layer 14 are formed on both sides of the through slit. However, it is not limited thereto, and it is possible to form the main body portion 14a and the flange portion 14b of the light-blocking adhesive layer 14 on the opening edge portion and the inner wall surface of one side of the through slit.

<Method of Manufacturing the Planar Light Emitting Device of the First Embodiment; One Example>

Hereinbelow, one example of the method of manufacturing the planar light emitting device 10 shown in FIG. 1A to FIG. 2B shall be described with reference to FIG. 3A to FIG. 3E.

First, the concave-convex portion 19A is formed by the aforementioned printing method at the required position on the one surface (surface that becomes the rear surface) 13a of the light guide 13 to form the light extracting portion 19, and the first adhesive material 15 is bonded on the outer periphery side of the one surface 13a of the light guide 13.

Figure 3A:
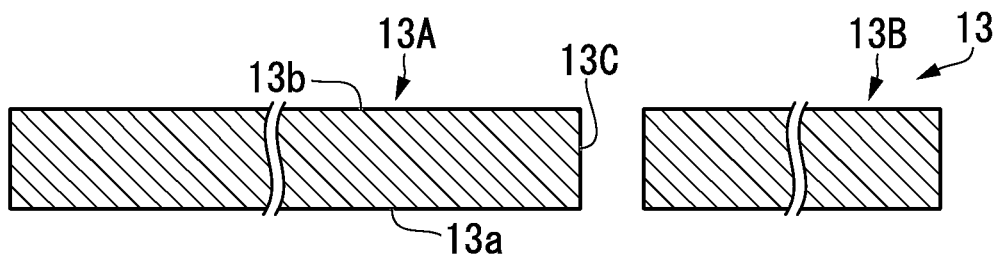
FIG. 3A is a drawing for describing one example of the method of manufacturing the planar light emitting device according to the first embodiment of the present invention, specifically being a cross-sectional view that shows the state in which a through slit is formed in the light guide.

From this state, as shown in FIG. 3A, a laser light such as a $CO_2$ laser light or the like is irradiated on the required position of the light guide 13 to fusion cut the light guide 13, whereby the through slit 13C having a U-shape in plan view is formed. In FIG. 3A, the concave-convex portion and light-extracting portion are omitted.

Note that in the present example, the through slit 13C is formed by fusion cutting the light guide 13 with laser light, but it is not limited thereto. The through slit 13C may also be formed by a punch out process using a die, and the through slit 13C may also be formed by etching. Among these, in the case of forming the through slit by the laser fusion cutting method, the processing speed is fast, which is advantageous for mass production, and even for a soft resin such as the aforementioned urethane resin or the like, the fusion-cut plane can be made smooth, and so is preferable on the point of being able to obtain a sharp fusion-cut plane.

Figure 3B:
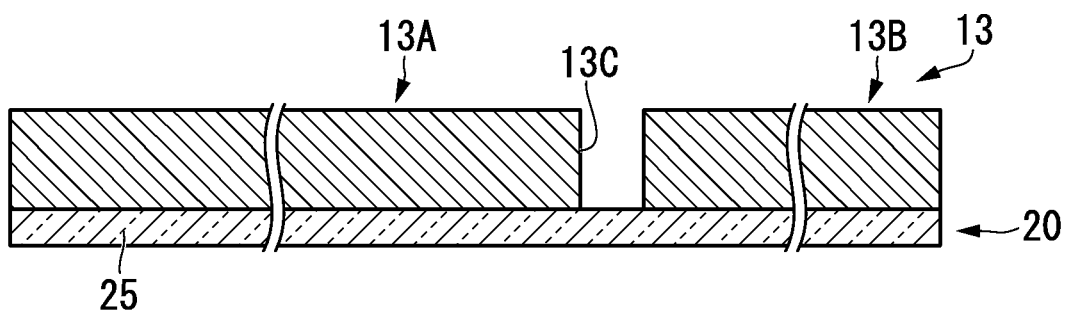
FIG. 3B is a cross-sectional view that shows the state of the switch sheet laminated on the light guide shown in FIG. 3A.

After forming the through slit 13C, as shown in FIG. 3B, the switch sheet 20 is bonded to the lower surface side of the light guide 13. Note that FIG. 3B shows the state of the light guide 13 and the switch sheet 20 in close contact, but a slight gap is formed between the light guide 13 and the switch sheet 20 corresponding to the thickness of the first adhesive material 15 that is provided on the outer periphery of the light guide 13. In FIG. 3B to FIG. 3F, this gap is omitted. Note that it is possible to increase or decrease the gap between the light guide 13 and the switch sheet 20 depending on the thickness of the first adhesive material 15, and the first adhesive material 15 may be omitted to bring the light guide 13 and the switch sheet 20 into contact. Either structure can be applied to the present invention.

Figure 3C:
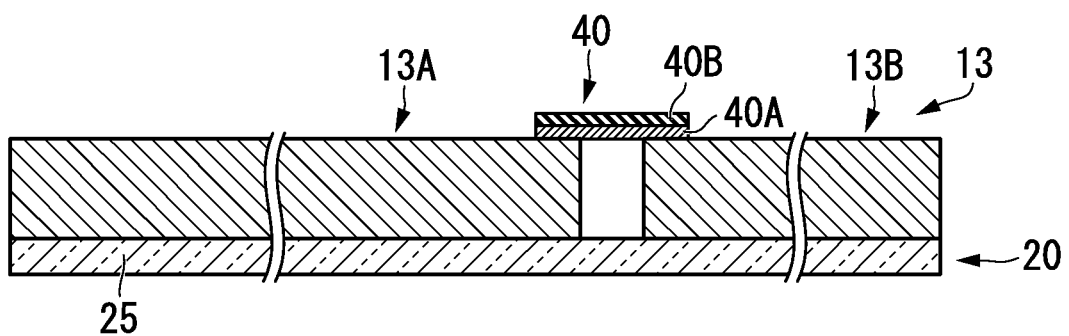
FIG. 3C is a cross-sectional view that shows the state of the light-blocking adhesive material arranged on the through slit shown in FIG. 3B.

Thereafter, as shown in FIG. 3C, a light-blocking adhesive material 40 with a two-layer structure that consists of a light-blocking layer 40B and a hot melt layer 40A is temporarily placed on the light guide 13 so as to cover the through slit 13C. In this case, the hot melt layer 40A is placed so as to make contact with the upper surface of the light guide 13. Here, as shown in FIG. 1A, the through slit 13C has a U-shape in plan view. Accordingly, the light-blocking adhesive material 40 also forms a U-shape that matches with the plan-view shape of the through slit 13C, with the light-blocking adhesive material 40 formed to be wider than the slit width of the through slit 13C.

Regarding the width of this light-blocking adhesive material 40, in the case of the light-blocking adhesive material 40 deforming in response to thermal deformation by a hot press process to be performed, it needs to spread over the entire inner portion of the through slit 13C and be able to reach the upper surface side of the switch sheet 20. Therefore, a light-blocking adhesive material 40 is used with a width and thickness that takes this deformation amount into account. Note that the hot melt adhesive material that constitutes the hot melt layer 40A has an appropriate tackiness at room temperature, and so when placed on the through slit 13C of the light guide 13, the light-blocking adhesive material 40 does not slide above the light guide 13, and so it can be temporarily positioned with ease.

Figure 3D:
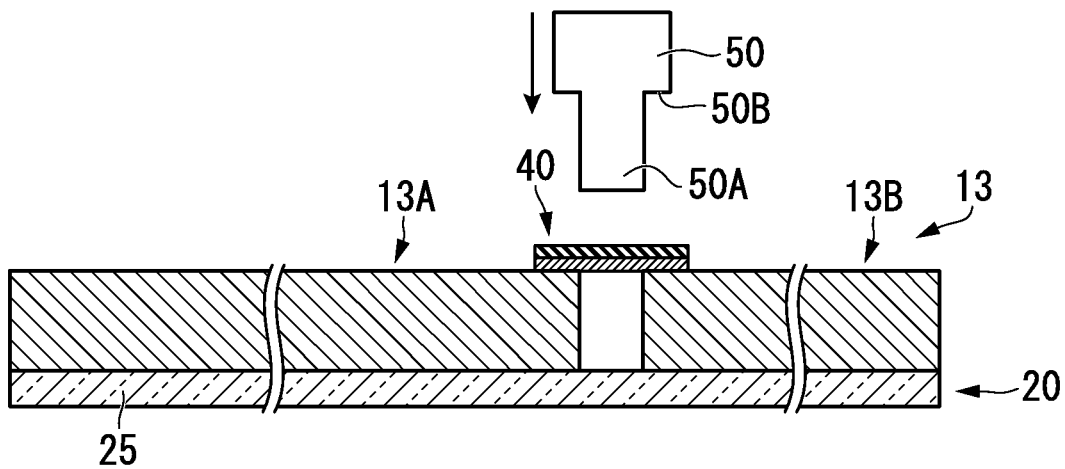
FIG. 3D is a cross-sectional view that shows the state of a heating press jig arranged on the light-blocking adhesive material shown in FIG. 3C.

Next, as shown in FIG. 3D, a hot press jig 50 is prepared that has the same U-shape as the plan-view shape of the through slit 13C and is provided with a convex portion 50A with a slightly smaller width than the through slit 13C. Note that a planate auxiliary pressing portion 50B that forms a step portion on the base portion side of the convex portion 50A is formed on both sides in the width direction of the convex portion 50A of this hot press jig 50.

Figure 3E:
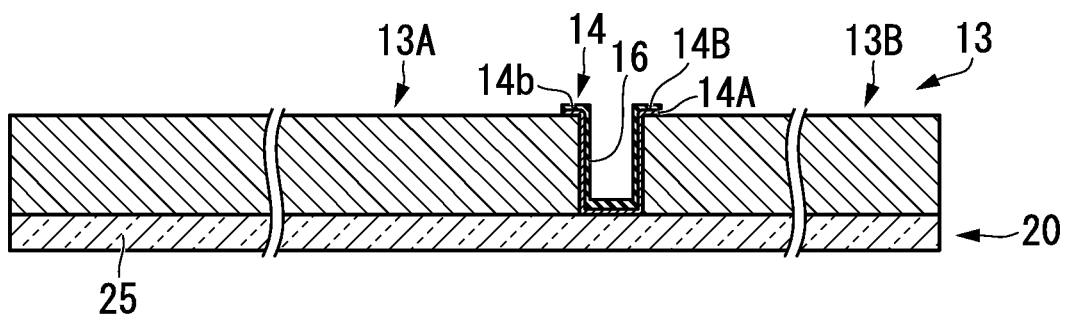
FIG. 3E is a cross-sectional view that shows the state of the light-blocking adhesive layer formed on the inside of the through slit shown in FIG. 3D.

This hot press jig 50 is heated to a temperature above the softening point of the light-blocking layer 40B and the hot melt layer 40A, and as shown in FIG. 3D, the convex portion 50A is lowered from above the through slit 13C downward (in the arrow direction), and pushes the light-blocking adhesive material 40 that is temporarily provided at the opening portion of the through slit 13C to the interior side of the through slit 13C. The light-blocking adhesive material 40, which has been heated to above softening portion, thermally deforms by being pressed by the convex portion 50A of the hot press jig 50, and flows along the inner surface shape of the through slit 13C. As a result, when the light-blocking adhesive material 40 has been cooled, as shown in FIG. 3E, it is possible to obtain the light-blocking adhesive layer 14 in the state of being attached to the bottom portion, the inner wall surfaces, and the opening edge portion of the through slit 13C. Note that if the hot press jig 50 is attached to a mold that has an upper mold and a lower mold that are capable of sandwiching the light guide 13 from above and below, respectively, so as to have a constitution that enables press fitting of the hot press jig 50 into the through slit 13C by clamping the molds, it is possible to perform a precise hot press process utilizing the mold accuracy of the mold.

Also, when causing the light-blocking adhesive material 40 to undergo thermal deformation with the convex portion 50A of the hot press jig 50, a hot press process is performed that sufficiently presses the hot melt layer 40A of the light-blocking adhesive material 40 against the switch sheet 20 side via the convex portion 50A by adjusting the press pressure, so as to be able to firmly bond the hot metal layer 14A to the switch sheet 20. Simultaneously, a hot press process is performed that sufficiently presses the hot melt layer 40A of the light-blocking adhesive material 40 against the light guide 13 at the opening edge portion of the through slit 13C using the auxiliary pressing portions 50B, 50B of the hot press jig 50, so that the hot melt layer 14A firmly adheres to the light guide 13.

With the above hot press process, it is possible to reliably bond the light-blocking adhesive layer 14 to the light guide 13 around the opening portion of the through slit 13C and to the switch sheet 20 at the bottom portion side of the through slit 13C. With this hot press process, it is possible to form the light-blocking adhesive layer 14 that has a high adhesive strength and resists exfoliation.

As described above, when forming the light-blocking adhesive layer 14 by the hot press process, even if the through slit 13C is a narrow slit, it is possible to form the light-blocking adhesive layer 14 with a shape that reliably extends over the inner wall surface, the bottom portion side and the opening edge portion side of the through slit 13C. Accordingly, it is possible to more reliably bond the light-blocking adhesive layer 14 compared to a method that arranges and inserts a separate light-blocking member in the through slit 13C.

For example, in the case of arranging in the through slit 13C a light-blocking member made of resin having excellent self-support and linearity independently of the through slit 13C, it is necessary for the thickness of this light-blocking member to be around 0.5 mm to 1.8 mm. However, in the case of forming the light-blocking adhesive layer 14 by the aforementioned hot press process, it is possible to reliably form the light-blocking adhesive layer 14 with a thickness of several tens of micrometers, for example, around 50 μm, within the through slit 13C. Accordingly, since it is possible to readily apply it to the through slit 13C having a width of 1 mm or less, it contributes to the miniaturization and weight saving of the light guide 13.

Note that in the embodiment of the present invention, the width of the through slit 13C is not limited, and it is possible to form the light-blocking adhesive layer 14 by a hot press process in the through slit 13C having a width of around 1.8 mm. In this case, it is possible to make a structure in which the light-blocking adhesive layer 14 that is several tens of micrometers thin is arranged on the inner side of the through slit having a width of 1.8 mm.

It is possible to obtain the planar light emitting device 10 in which the light guide 13 and the switch sheet 20 are laminated by the manufacturing method described above. In the planar light emitting device 10 that is manufactured in this way, it is possible to reliably form the light-blocking adhesive layer 14 on the inner surface side of the through slit 13C with an accurate thickness and size and good adhesive property. It is possible to easily perform mass production and it is possible to keep down the manufacturing unit cost, by forming the light-blocking adhesive layer 14 with the hot press process.

In the manufacturing method described above, in the case of performing a hot press process that pushes the light-blocking adhesive material 40 into the through slit 13C of the light guide 13 by the hot press jig 50, with regard to the adhesion width of the light-blocking adhesive material 40, when expecting the positioning accuracy of the processing to be 0.3 to 0.5 mm, and assuming the thickness of the light guide 13 to be 0.2 mm, given that a relationship established in which the width of the light-blocking adhesive material (adhesive width prior to being pushed in) (1 to 1.2 mm)=the through slit width (0.35 mm)+the light guide thickness×2 (0.4 mm)+the positioning accuracy (0.3 to 0.5 mm), it is considered possible to manufacture the present embodiment by making allowance for the margin and presuming the width of the light-blocking adhesive material (the adhesion width prior to being pushed in) to be the through slit width+0.7 mm to 1.2 mm.

For example, assuming the through slit width to be 0.35 mm, it can be performed with the width of the light-blocking adhesive material being 1.0 mm. This value is the value of the level that can be sufficiently achieved in the case of performing a hot press process with an ordinary molding process, and so there is no problem when mass producing the light guide 13 by forming the light-blocking adhesive layer 14 inside of the through slit 13C.

Also, in the case of performing the hot press process using the hot press jig 50 with the aforementioned structure, the adhesive strength of the hot melt layer 14A with respect to the inner wall surface of the through slit 13C is not strong compared to the adhesive force with respect to the opening edge portion of the through slit 13C and the switch sheet 20 side. In the case of trying to obtain a stronger adhesive force with respect to the inner wall surface of the through slit 13C, it is possible to obtain a stronger adhesive force with respect to the inner wall surface of the through slit 13C if a separate pressing operation is performed using another jig that can press the hot melt layer 14A against the inner wall surface of the through slit 13C in addition to the pressing operation with the hot press jig 50.

In the case of forming the through slit 13C by performing laser fusion cutting on the light guide 13, it is possible for the through slit 13C to be fusion cut in a cross-sectional V-shape by the irradiation state of the laser light.

Figure 3F:
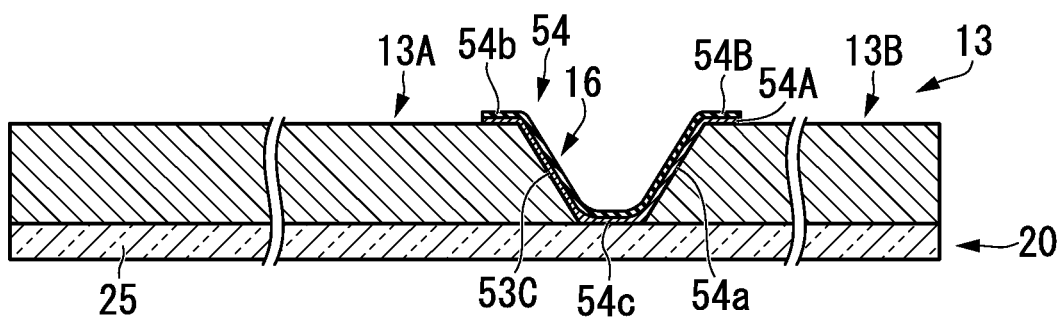
FIG. 3F is a cross-sectional view that shows the state of the light-blocking adhesive layer formed in through slit at a case where the through slit being wide with a transverse cross-sectional V-shape.

In this case, a light-blocking adhesive layer with a cross-sectional shape that matches with the shape of the through slit that has been laser fusion cut is formed. FIG. 3F shows one example thereof.

In the example shown in this FIG. 3F, the through slit 53C that is formed in the light guide 13 is formed with a transverse-sectional V-shape, and a light-blocking adhesive layer 54 is formed so as to cover this through slit 53C.

The light-blocking adhesive layer 54 is the same as the preceding description on the point of having a two-layer structure that consists of a hot melt layer 54A and a light-blocking layer 54B, and the light-blocking adhesive layer 54 is the same as the preceding example on the point of being constituted from a main body portion 54a, a flange portion 54b, and a bottom portion 54c. However, the main body portion 54a of the light-blocking adhesive layer 54 of this example covers the sloping inner wall surfaces of the through slit 53C, the flange portion 54b covers the opening edge portion of the through slit 53C that is wider than the preceding example, and the base portion 54c is bonded to the upper surface of the switch sheet 20 via the adhesive layer and the hot melt layer 54A.

The light-blocking adhesive layer 54 of the structure shown in FIG. 3F exhibits the same effect as the light-blocking adhesive layer 14 of the preceding example.

Note that in the case of realizing the structure shown in FIG. 3F, it is possible to use a hot press jig with a convex shape such as a mushroom-shape (having a cross-sectional V-shape convex portion) that matches the through slit 53C with a transverse-sectional V-shape, instead of the hot press jig having a simple convex shape shown in FIG. 3D. When forming the light-blocking adhesive layer 54 by the hot press jig having this kind of shape, it is possible to press the flange portion 54b on the light guide 13 at the opening edge portion of the through slit 53C, and press the bottom portion 54c on the upper surface of the switch sheet 20, and also possible to press the main body portion 54a at the sloping inner wall surface of the through slit 53C. As a result, the effect of the light-blocking adhesive layer 54 being firmly attached to the light guide 13 and the switch sheet 20 with higher adhesion strength is obtained.

<Method of Manufacturing the Planar Light Emitting Device of the First Embodiment; Another Example>

Hereinbelow, another example of the method of manufacturing the planar light emitting device shall be described with reference to FIG. 4A to FIG. 4E.

The manufacturing method shown in FIG. 4A to FIG. 4E differs from the manufacturing method according to the one example shown in FIG. 3A to FIG. 3E on the point of an adhesive material (spacer) being extended to be attached to other portions in addition to the outer periphery edge portion of the one surface 13a of the light guide 13.

That is to say, a first adhesive material (first spacer) 15 is affixed to the outer peripheral edge portion of the one surface (surface that becomes the rear surface) 13a of the light guide 13. Moreover, a second adhesive material (second spacer) 15A that is wider than the through slit 13C is affixed at the formation position of the through slit 13C that has a U-shape in plan view and the peripheral portion thereof on the one surface 13a side of the light guide 13. That is to say, the first adhesive material 15 that has a rectangular shape in plan view is formed at the outer peripheral edge portion of the one surface 13a side of the light guide 13, and moreover the second adhesive material 15A that is wider than the through slit 13C and has a U-shape in plan view is formed at the position where the through slit 13C is to be formed. When this second adhesive material 15A for example has a thickness that is small, and when a dark color such as black is added to this adhesive material, it can also function as a light-blocking layer.

Figure 4A:
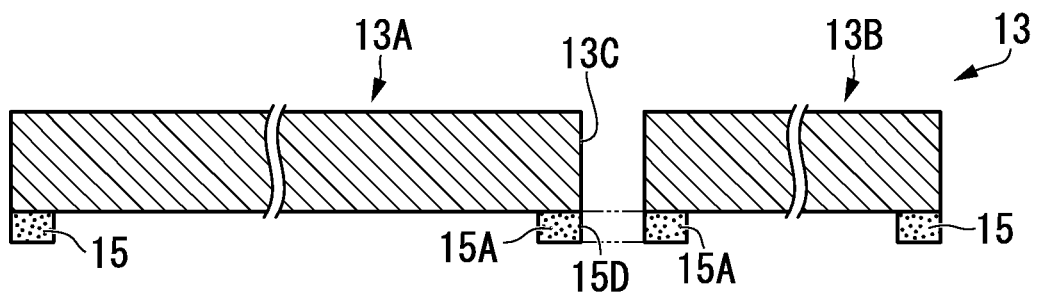
FIG. 4A is a drawing for describing another example of the method of manufacturing the planar light emitting device according to the first embodiment of the present invention, specifically being a cross-sectional view that shows the state in which a through slit is formed in the light guide that is provided with an adhesive layer.

In the method shown in FIG. 4A to FIG. 4E, the through slit 13C is formed in the light guide 13 by laser fusion cutting, similarly to the manufacturing method according to one example shown in FIG. 3A to FIG. 3E. As shown in FIG. 4A, the second adhesive material (second spacer) 15A that is positioned under the through slit 13C is also fusion cut by this laser fusion cutting, and the hole portion 15D that is continuous with the through slit 13C is formed.

Figure 4B:
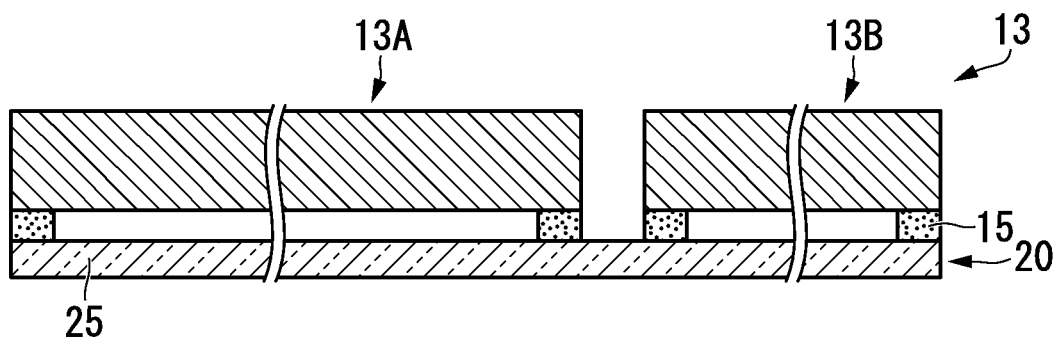
FIG. 4B is a cross-sectional view that shows the state of the switch sheet laminated on the light guide shown in FIG. 4A.
Figure 4C:
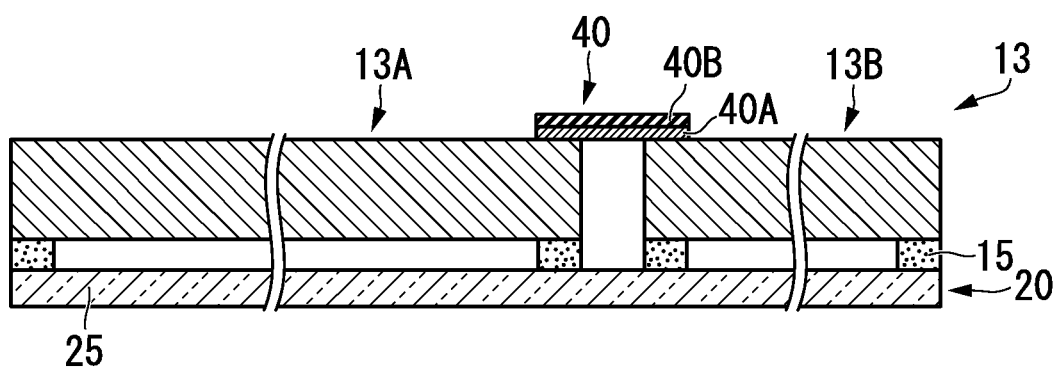
FIG. 4C is a cross-sectional view that shows the state of the light-blocking adhesive material arranged on the through slit shown in FIG. 4B.

Subsequently, as shown in FIG. 4B, the switch sheet 20 is affixed to light guide 13 via the first and second adhesive materials 15 and 15A. Then, as shown in FIG. 4C, the light-blocking adhesive material 40 is temporarily positioned on top of the through slit 13C. In the same manner as the aforementioned example, the light-blocking adhesive material 40 is arranged on top of the light guide 13 so as to cover the through slit 13C. Then, as shown in FIG. 4D, by pressing the light-blocking adhesive material 40 while causing the light-blocking adhesive material 40 to undergo thermal deformation along the through slit 13C and the hole portion 15D by the hot press jig 50, the light-blocking adhesive layer 14 shown in FIG. 4E is formed, and it is possible to manufacture the planar light emitting device in which the light guide 13 and the switch sheet 20 are laminated.

In the manufacturing method according to the other example described based on FIG. 4A to FIG. 4E, the hole portion 15D is formed by laser fusion cutting in the second adhesive material (second spacer) 15A, but it is possible to manufacture the light guide by machining so as to not laser fusion cut the second adhesive material 15A.

Figure 4D:
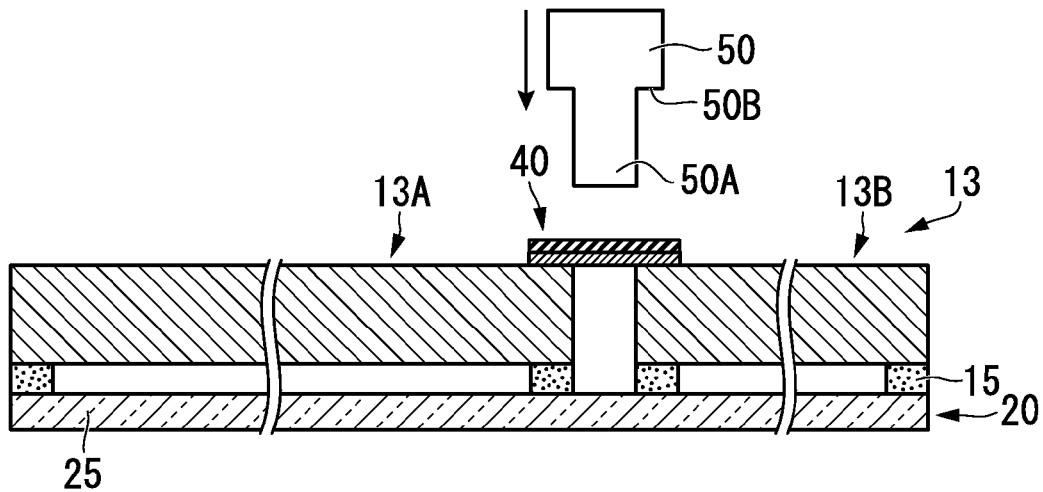
FIG. 4D is a cross-sectional view that shows the state of the heating press jig arranged on the light-blocking adhesive material shown in FIG. 4C.
Figure 4E:
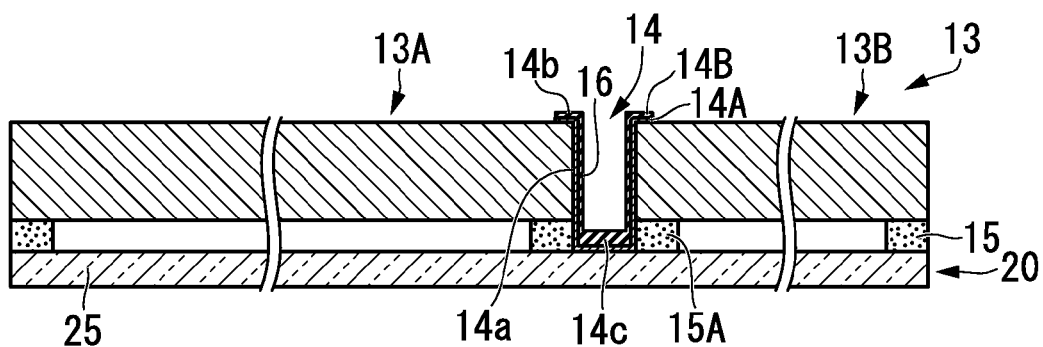
FIG. 4E is a cross-sectional view that shows the state of the light-blocking adhesive layer formed on the inside of the through slit and the adhesive layer shown in FIG. 4D.
Figure 4F:
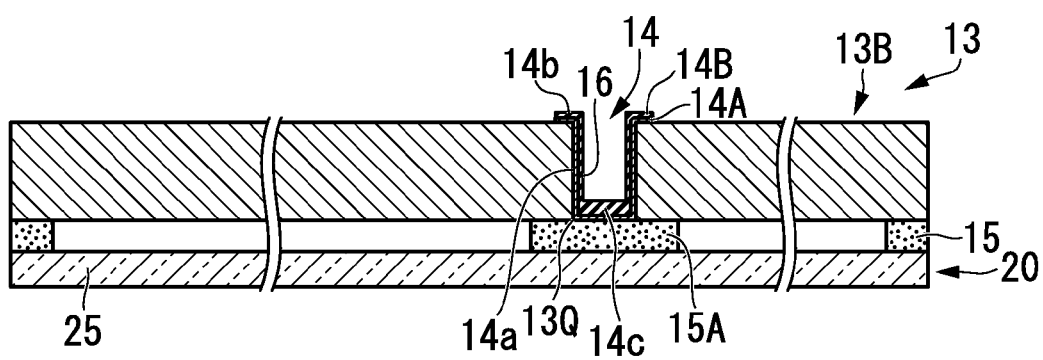
FIG. 4F is a cross-sectional view that shows an example of the bottom portion of the light-blocking adhesive layer formed on the front face of a second adhesive material.

For example, after forming the through slit portion 13C by laser fusion cutting in the light guide 13, it is affixed to the switch sheet 20 after bonding the first adhesive material 15 and the second adhesive material 15A, and thereafter by temporarily installing the light-blocking adhesive material 40 as described in FIG. 4C to FIG. 4E, it may be pressed by the hot press jig 50. In this case, as shown in FIG. 4F, the bottom portion 14c of the light-blocking adhesive layer 14 that is formed after pressing is adhered to the upper surface of the second adhesive material (second spacer) 15A that is formed on the switch sheet 20, and not the upper surface of the switch sheet 20. Although the amount of light that leaks out from the light guide increases by the corner, in the aspect shown in FIG. 4F, since the bottom portion of the light-blocking layer is formed in the transverse direction of the corner 13Q of the bottom portion of the light guide, the light-blocking layer is formed thicker in the width direction than the other portions, and so the light blocking is more secure. Note that since the adhesive surface area between the switch sheet and the second adhesive member increases, it is possible to increase the durability. Moreover, compared to the other aspects, since the formation surface area of the light-blocking layer is less, it is possible to conserve the amount of the light blocking layer.

Also, in the case of performing the laser fusion cutting after bonding the second adhesive material 15A to the light guide 13, the laser fusion cutting operation may be stopped at the bottom surface position of the light guide 13 without laser fusion cutting the second adhesive material 15A, and from the state of the second adhesive material 15A remaining without fusion cutting the second adhesive material 15A, the light-blocking adhesive material 40 may be temporarily placed as shown in FIG. 4C to FIG. 4E, and it may be pressed by the hot press jig 50.

Either case leads to a structure in which the bottom portion 14c of the light-blocking adhesive layer 14 is bonded to the upper surface of the second adhesive material (second spacer) 15A on the switch sheet 20.

In the case while selecting the structure according to these manufacturing methods, since the second adhesive material 15A remains behind as shown by the two-dot chain line in FIG. 4A, without the hole portion 15D being formed in the second adhesive material 15A as shown in FIG. 4A, it is possible to form the light-blocking adhesive layer 14 by bonding the bottom portion 14c of the light-blocking adhesive layer 14 to this portion as shown in FIG. 4F.

That is to say, the light-blocking adhesive layer 14 may be formed by forming the bottom portion 14c so as to extend over the upper surface of the switch sheet 20 as in the preceding embodiment, and the light-blocking adhesive layer 14 may be formed by bonding the bottom portion 14c on the second adhesive material (second spacer) 15A above the switch sheet 20, and in either case it is possible to attain the object of the present invention.

<Examples>

Using a plurality of light guides made of urethane resin with a thickness of 0.2 mm, and forming through slits with a fusion cut width of 0.35 mm by a $CO_2$ laser in these light guides, a plurality of samples in which a through slit is formed are obtained. The variation, a, in the groove width of the through slit that is formed was 0.01 mm. Since the $CO_2$ laser fusion cut the light guide at its focal point position, the variation in the groove width is sufficiently small, indicating it is a level allowing mass production.

The switch sheet is affixed to the light guide in which this through slit is formed. Using a film (light-blocking adhesive material) with a general thickness of 50 μm, having a two-layer structure consisting of a black PET layer with a thickness of 25 μm and a hot melt adhesive layer made of styrene resin having a thickness of 25 μm, this film is temporarily placed on the opening portion of the through slit so as to cover the through slit. The hot press jig having a convex portion shown in FIG. 3D is used to press this film and perform the hot press process. The width of the convex portion of the hot press jig that is used here is 0.35 mm, and the overall width of the hot press jig at the base portion side of the convex portion is 0.8 mm. Accordingly, it is a hot press jig with a structure having an auxiliary pressing portion with a width of 0.225 mm on both sides of the convex portion. Also, when the distal end of the convex portion reaches the bottom portion of the through slit, the auxiliary pressing portions on both sides of the convex portion can press the upper surface of the light guide. The conditions of the hot press process are a heating temperature of 120° C., a pressing time of 10 seconds, and a pressing force of 300 kPa.

Figure 5A:
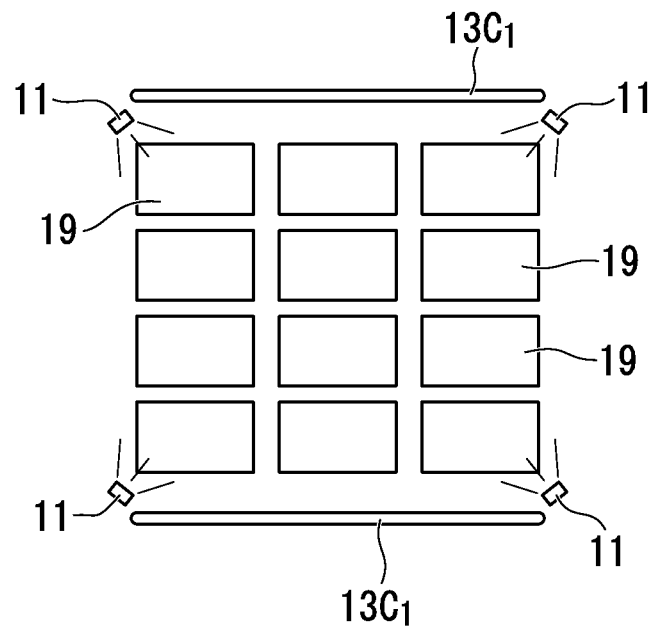
FIG. 5A is a schematic illustration for describing the result of a light-blocking test performed using the planar light emitting device of the embodiment provided with the structure of the present invention, being a drawing that shows the light-blocking test result in the case of being applied to an operation switch structure consisting of 3 columns×4 rows.

By applying the light-blocking adhesive layer that is formed under the above conditions to the light guide of the portion of the operation switches of a mobile telephone as shown in FIG. 5A, a test is performed to measure the light-blocking rate of this light-blocking adhesive layer. In the planar light emitting device shown in FIG. 5A, a first light sources 11 consisting of an LED are arranged at each of the four corner portions of light extracting portions formed in an array of three columns and four rows, for a light guide having operation switches in which light extracting portions consisting of concave-convex portions formed in the light guide are formed in an array of three columns and four rows. A through slit $13C_1$ with the aforementioned size is respectively formed at a position separated by 1 mm along the upper side of the light extracting portions of the first row, and at a position separated by 1 mm along the lower side of the light extracting portions of the fourth row as shown in FIG. 5A, and after turning on the four LEDs 11, the luminance of the light that leaks to the outer side of the through slit is measured, and thereby the light-blocking rate is measured.

The light blocking rate is indicated by 1−(total luminance value at the region that should block light:total luminance value of the leakage light)/(total luminance value of the entire area of the light guide) [%].

In the present embodiment, the light blocking rate is 95%, and thus it is possible to obtain a superior result.

Also, when manufacturing the planar light emitting device having the aforementioned structure, assuming the through slit width to be 0.35 mm, the width of the light-blocking adhesive layer 14 after the hot press process (the width from the distal end portion of one flange portion 14b of the light-blocking adhesive layer 14 to the distal end portion of the other flange portion 14b) becomes a width that adds 0.3 to 0.5 mm, which is the position alignment accuracy margin, to the through slit width.

As one example, it is possible to express this as (adhesive width: 0.65 mm to 0.95 mm)=(through slit width: 0.35 mm)+ (position alignment accuracy margin: 0.3 mm to 0.5 mm).

In the present Example, it is proven that it is possible to achieve a structure according to the present embodiment with an adhesive width of around 0.6 mm by adjusting the hot press jig, and it is possible to manufacture it with a sufficiently high precision.

<Durability Test>

An environmental durability test and a repeated pressing force application test are performed on a plurality of samples of light guides manufactured under the aforementioned conditions (examples 1 to 23 shown in Tables 1 and 2 given below). In each example, various samples are prepared with the thickness of the light-blocking layer (μm), the thickness of the hot melt layer (μm), the type of light-blocking layer material, the type of hot melt layer material, the structure, the length of the flange portion covering the opening edge portion of the through slit (length of one side in the lateral direction: mm), the through slit width (mm), and the existence or non-existence of an adhesive layer serving as conditions, and each sample is tested.

As the environmental durability test, an environmental durability test is performed that repeatedly alternates eight times between an ordinary temperature maintained for nine hours and a high temperature maintained for nine hours, for an ordinary-temperature holding state (25° C., humidity 95%) and a high temperature of 55° C., high humidity environment (humidity 95%). Due to this test, the light guide repeatedly undergoes thermal expansion and thermal contraction, and thermal stress is repeatedly impressed on the portion of the light-blocking adhesive layer. Table 1 and Table 2 below show the results of these tests.

TABLE 1

| | Light-Blocking Layer Material | Hot Melt Layer Material | Structure | Light-Blocking Layer Thickness (μm) | Hot Melt Layer Thickness (μm) |
|---|---|---|---|---|---|
| Example 1 | PET | Styrene resin | Concave structure (both sides shielded) | 25 | 25 |
| Example 2 | PET | | Concave structure (both sides shielded) | 10 | 25 |
| Example 3 | PET | | Concave structure (both sides shielded) | 25 | 25 |
| Example 4 | PET | | Concave structure (both sides shielded) | 50 | 25 |
| Example 5 | PET | | Concave structure (both sides shielded) | 100 | 25 |
| Example 6 | PET | | Concave structure (both sides shielded) | 25 | 10 |
| Example 7 | PET | | Concave structure (both sides shielded) | 25 | 25 |
| Example 8 | PET | | Concave structure (both sides shielded) | 25 | 50 |
| Example 9 | PET | | Concave structure (both sides shielded) | 25 | 100 |
| Example 10 | PET | | Concave structure (both sides shielded) | 25 | 25 |
| Example 11 | PET | | Concave structure (both sides shielded) | 25 | 25 |

TABLE 1-continued

| | Light-Blocking Layer Material | Hot Melt Layer Material | Structure | Light-Blocking Layer Thickness (μm) | Hot Melt Layer Thickness (μm) |
|---|---|---|---|---|---|
| Example 12 | PET | | Concave structure (both sides shielded) | 25 | 25 |
| Example 13 | PET | | Concave structure (both sides shielded) | 25 | 25 |
| Example 14 | PET | | Concave structure (both sides shielded) | 25 | 25 |
| Example 15 | PET | | Concave structure (both sides shielded) | 25 | 25 |
| Example 16 | PET | | Concave structure (both sides shielded) | 25 | 25 |
| Example 17 | PET | | Concave structure (both sides shielded) | 25 | 25 |
| Example 18 | PET | | One-sided shielded structure | 25 | 25 |
| Example 19 | PET | | Concave structure (both sides shielded) | 25 | 25 |
| Example 20 | Urethane | | Concave structure (both sides shielded) | 25 | 25 |
| Example 21 | PET | Polyamide resin | Concave structure (both sides shielded) | 25 | 25 |
| Example 22 | PET | Polyurethane resin | Concave structure (both sides shielded) | 25 | 25 |
| Example 23 | PET | Styrene resin | Concave structure (both sides shielded) | 25 | 25 |
| Comparative Example 1 | | Silicon | Completely filled in structure | — | — |
| Comparative Example 2 | | PET | Completely filled in structure | — | — |
| Comparative Example 3 | | Black filler added to polyurethane resin | Completely filled in structure | — | — |

TABLE 2

| | One-sided Length in Lateral Direction Covering Opening Edge Portion (mm) | Slit Width (mm) | Adhesive Layer | Environmental Durability Test 25° C. 9 hours 55° C. 9 hours in 95% humidity | Repeated Pressing Test 0.8 kg, 1 million strokes | Occurrence of Region in which Reflected Light Shines Along Groove | Light Blocking Rate |
|---|---|---|---|---|---|---|---|
| Example 1 | 0.1 | 0.35 | No | F | G | None | 95% or more (G) |
| Example 2 | 0.1 | 0.35 | | | | | 90% (F) |
| Example 3 | 0.1 | 0.35 | | | | | 95% or more (G) |
| Example 4 | 0.1 | 0.35 | | | | | |
| Example 5 | 0.1 | 0.35 | | | | | |
| Example 6 | 0.1 | 0.35 | | | F | | |
| Example 7 | 0.1 | 0.35 | | | G | | |
| Example 8 | 0.1 | 0.35 | | | | | |
| Example 9 | 0.1 | 0.35 | | | | | |
| Example 10 | 0.05 | 0.35 | | | F | | |
| Example 11 | 0.25 | 0.35 | | | G | | |
| Example 12 | 0.3 | 0.35 | | | | | |
| Example 13 | 0.5 | 0.35 | | | | | |
| Example 14 | 0.1 | 0.1 | | | | | |
| Example 15 | 0.1 | 0.35 | | | | | |
| Example 16 | 0.1 | 0.5 | | | | | |
| Example 17 | 0.1 | 1 | | | | | |
| Example 18 | 0.1 | 0.35 | | | F | None | 90% (F) |
| Example 19 | 0.1 | 0.35 | | | G | None | 95% or more (G) |
| Example 20 | 0.1 | 0.35 | | | | | |
| Example 21 | 0.1 | 0.35 | | | | | |
| Example 22 | 0.1 | 0.35 | | | | | |
| Example 23 | 0.1 | 0.35 | Yes | | | | |
| Comparative Example 1 | — | — | | NG | F | Occurs | 95% or more (G) |
| Comparative Example 2 | — | — | | NG | F | | |
| Comparative Example 3 | — | — | | NG | F | | |

Definitions in environmental durability test
F: 144 hours or more
NG: 100 hours or less
Definitions in repeated pressing test
G: 1 million times or more
F: 300,000 to 1 million times
NG: 10,000 times or less It is proven that all of the light-blocking adhesive layers of the light guide samples manufactured by the above manufacturing method could withstand the environmental test and exhibit high environmental durability without exfoliating.

Next, for a plurality of samples of light guides manufactured by the above conditions, a repeated pressing durability test is performed that repeatedly applied in 1 million cycles a load of 0.8 kg with a metal piston rod having a diameter of 1 cm directly from above to the center portion of the through slit having a U-shape in plan view.

By this test, it is proven that each sample withstood repeated pressings of 300,000 to 1 million times or more, and all of the light-blocking adhesive layers manufactured by the above manufacturing method have excellent repeated pressing durability.

Next, for comparison, a similar environmental durability test and a repeated pressing durability test are performed on comparison examples 1 to 3 in which a silicon or PET resin that is dyed black, or a polyurethane resin in which a black filler is mixed is filled in the through slit and cured, to form a light-blocking portion that completely fills in the through slit. Also, a test similar to the light-blocking rate measurement test that is performed on the preceding embodiments is performed on each comparison example to measure the light blocking rate. These test results are also shown in Table 1 and Table 2.

From the overall results shown in Table 1 and Table 2, in the planar light emitting device according to the present embodiment, it is possible to obtain excellent results in all of the environmental durability test, the repeated pressing test, and the light blocking rate test.

Note that in the sample of Comparison Example 1 that covered the entirety of the through slit with a black-dyed silicon resin, after 100 hours elapsed in the environmental durability test, the light guide made of urethane resin started to discolor. This is considered due to the heat dissipation worsening and the degradation of the urethane resin that constitutes the light guide processing when the entire through slit is covered with resin. When discoloration of the urethane resin occurs, there is a risk that the light transmission rate of the light guide will fall.

Figure 5B:
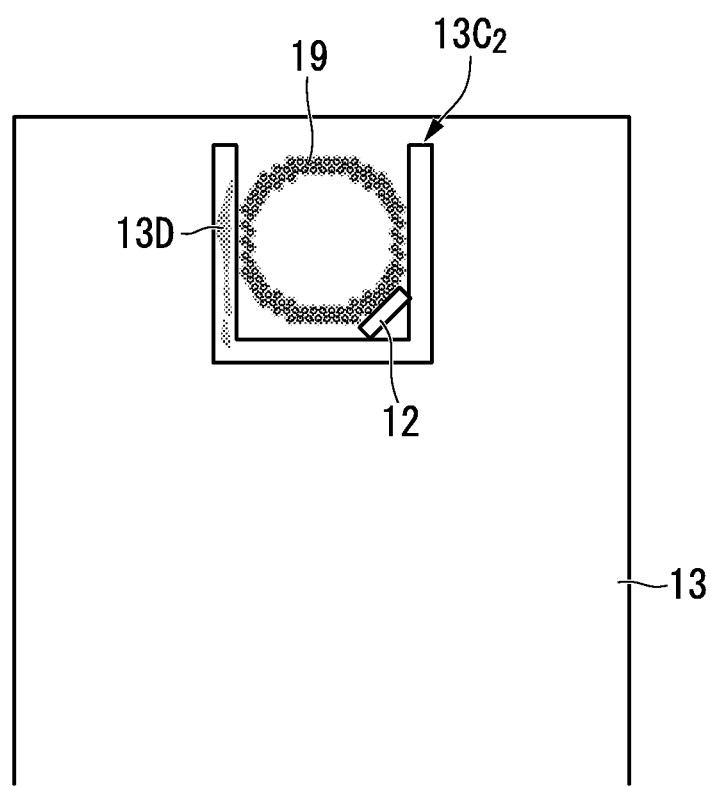
FIG. 5B is a schematic drawing that describes the result of a light-blocking test that is performed using the planar light emitting device of the embodiment provided with the structure of the present invention, being a drawing that shows the light-blocking test result in the case of being applied to a through slit with a U-shape in plan view.

Also, the evaluation of the column labeled "Occurrence of Region in which Reflected Light Shines Along Groove" in Table 2 shows samples that, among samples having a U-shaped through slit $13C_2$ with the same structure as FIG. 1A as shown in FIG. 5B, produced a light leakage portion 13D at a portion of the through slit $13C_2$ on the left side, which is the side that the outgoing light from the LED 12 faces, as shown in FIG. 5B, when light from the LED 12 is irradiated.

Second Embodiment

Hereinbelow, the planar light emitting device according to the second embodiment of the present invention shall be described. In the present embodiment, the structures differing from the first embodiment shall be described in detail, while descriptions of the same structures shall be omitted or simplified.

In the same manner as the first embodiment, the following embodiments shall be described in detail in order to allow better understanding of the gist of the present invention, and unless otherwise specified, will not serve to limit the present invention.

Figure 6A:
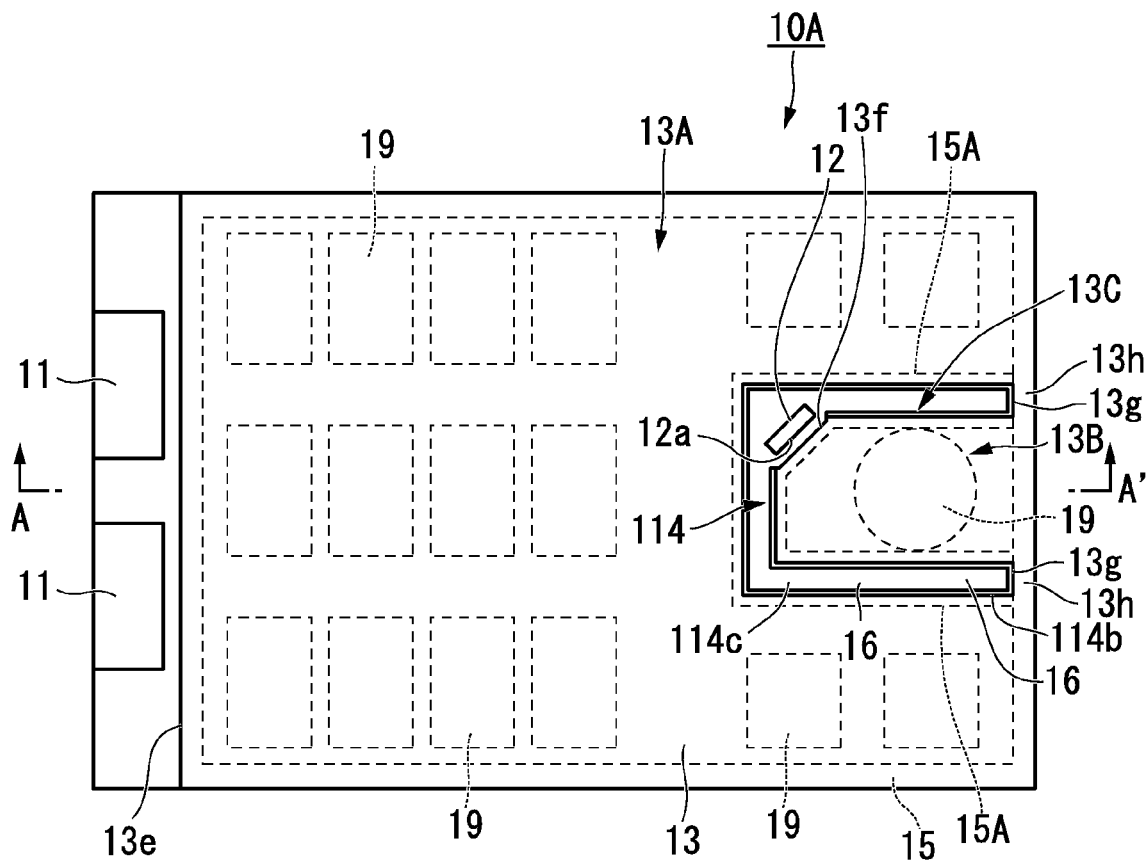
FIG. 6A is a plan view that shows an outline of a planar light emitting device according to a second embodiment of the present invention.
Figure 6B:
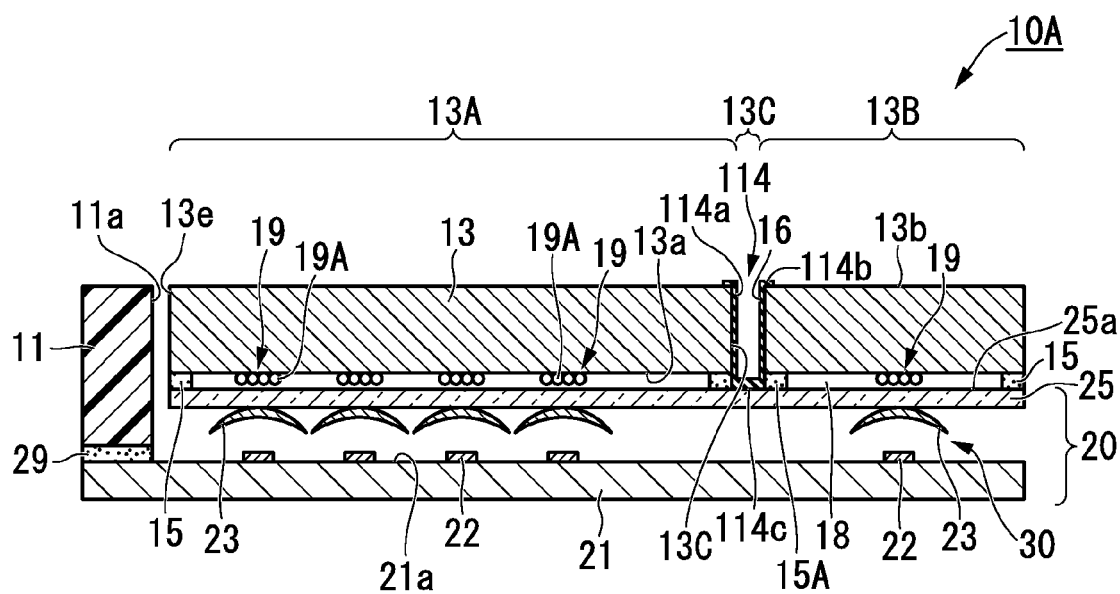
FIG. 6B is a cross-sectional view along line A-A' in FIG. 6A.
Figure 7A:
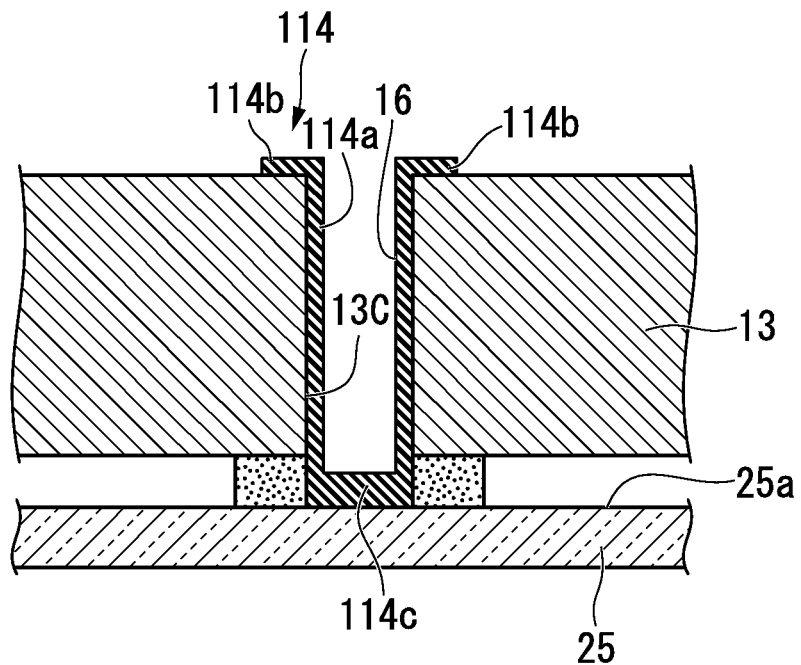
FIG. 7A is an enlarged cross-sectional view of the through slit portion of the planar light emitting device shown in FIG. 6B.
Figure 7B:
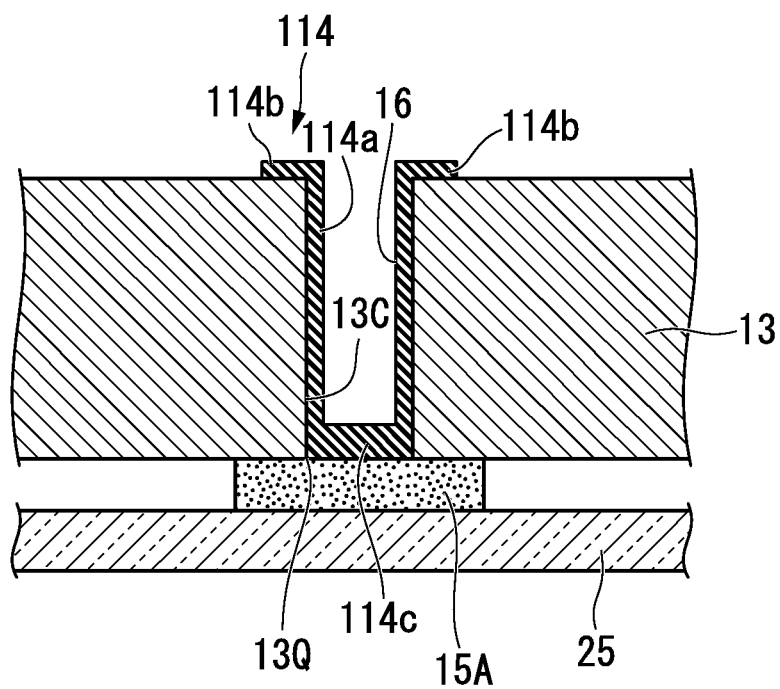
FIG. 7B is an enlarged cross-sectional view that shows a modification of the planar light emitting device according to the second embodiment of the present invention.

FIG. 6A to FIG. 7B are outline drawings that show the planar light emitting device according to the second embodiment of the present invention. Among them, FIG. 6A is a plan view, FIG. 6B is a cross-sectional view along line A-A' of FIG. 6A, and FIG. 7A is a partial magnified view of the planar light emitting device shown in FIG. 6. FIG. 7B and FIG. 7C are partial magnified views that show modifications of the planar light emitting device according to the second embodiment of the present invention.

Similarly to the first embodiment, the planar light emitting device 10A according to the present embodiment is provided with first light sources 11 and 11, a second light source 12, a sheet-like light guide 13 having a rectangular shape in plan view that is arranged in the vicinity of the exit face 11a of the first light source 11, and a switch sheet 20 that is arranged on the one surface (lower surface) 13a side of the light guide 13.

As shown by the dotted line in FIG. 6A, a first adhesive material (first spacer) 15 that has a rectangular shape in plan view is provided in a rectangular shape at the periphery of the one surface 13a of the light guide 13. Moreover, a second adhesive material (second spacer) 15A is provided at the periphery of the through slit 13C, on the one surface 13a side of the light guide 13. As shown in FIG. 6B, the switch sheet 20 is bonded to the one surface 13a of the light guide 13 via the first adhesive material (first spacer) 15 and the second adhesive material (second spacer) 15A. With this structure, a gap 18 is provided between the light guide 13 and the switch sheet 20. That is to say, the light guide 13 and the switch sheet 20 are not in contact, but rather the two are oppositely arranged spaced apart by the gap 18 in accordance with the thickness of the first adhesive material 15 and the second adhesive material 15A.

An adhesive that retains its own shape is used as the first adhesive material 15 and the second adhesive material 15A. Examples of such an adhesive are the same as those of the first adhesive material 15 in the first embodiment.

The thickness of the gap 18 that is provided between the light guide 13 and the switch sheet 20, the structure of the light guide 13 that is segmented into a first region 13A and a second region 13B, and the structure of the through slit 13C are the same as the first embodiment, and so explanations thereof shall be omitted.

In the present embodiment, the second adhesive (second spacer) 15A is provided on the periphery of the switch sheet 20 side of the through slit 13C, and the first region 13A and the second region 13B of the light guide 13 are respectively bonded and fixed to the switch sheet 20 using the first adhesive material (first spacer) 15 and the second adhesive material (second spacer) 15A.

Also, in the same manner as the first embodiment, one end portion (free end) 13f of the second region 13B of the light guide 13 is formed so as to be diagonally cut away in the case of viewing the light guide 13 in plan view. That is to say, as shown in FIG. 6A, the corner portion of the one end portion (free end) 13f of the second region 13B is cut away at an angle.

Note that similarly to the first embodiment, in the U-shaped through slit 13C seen in plan view in FIG. 6A, a light-blocking layer 114 is omitted at the one end portion 13f for making light incident from the second light source 12 to the second region 13B, and it is possible to introduce light from the second light source 12 to the second region 13B of the light guide 13. That is to say, the light-blocking layer 114 has been formed at the second region 13B of the light guide 13, except for the one end portion 13f.

The constituent material and thickness of the light guide 13 are not particularly limited, with the same materials as those of the first embodiment included, and it being possible to set it to a thickness of the same range.

Then, a light-blocking layer 114 that is formed by a dispenser device described below is provided on the inner surface side of the through slit 13C of the light guide 13. This light-blocking layer 114 is formed along the inner wall surface of the through slit 13C having a U-shape in plan view so as to cover the entire inner wall surface thereof. That is to say, this light-blocking layer 114 is formed in an approximate U-shape in transverse section, and consists of a main body portion 114a that adheres to the inner wall surface of the through slit 13C and covers it, a flange portion 114b that is formed extending to the upper portion side of the main body portion 114a to cover by a predetermined width the upper surface opening edge portion of the through slit 13C, and a bottom portion 114c formed at the lower portion side of the main body portion 114a (switch sheet 20 side) so as to project from the lower surface of the light guide 13 to adhere to the upper surface (one surface) of the switch sheet 20, and fill in the gap between the bottom portion of the through slit 13C and the switch sheet 20.

Since the light-blocking layer 114 is formed to be thinner than the width of the through slit 13C, and is formed so as to cover the entire inner wall surface of the through slit 13C, a groove-type recess portion 16 is formed between the mutually facing main body portions 114a, 114a on the inside of the through slit 13C. Note that in the present embodiment, in the cross-sectional drawing of the light emitting device, the light-blocking layer 114 is formed so as to cover the inner wall surface of both sides of the through slit 13C, but it is not limited thereto, and the light-blocking layer 114 may be formed on only one inner wall surface.

The light-blocking layer 114 of the present embodiment is constituted from a material with a light-blocking property such as black ink.

The light-blocking layer 114 consists of a light-blocking resin material with a black color or dark color having a high light blocking performance such as carbon black, silicon and the like. Note in the present embodiment since the light-blocking resin material that constitutes the light-blocking layer 114 should blocks light, in addition to a black resin or dark resin with the aforementioned high light-blocking performance, a structure that includes a material with light reflectivity serves as one type of resin with a light blocking effect of the present embodiment. For example, a light-blocking layer made of resin having light reflectivity that includes a filler that has light reflecting properties may be applied as a light-blocking layer. The light-blocking layer 114 of the present embodiment can use the same resin as the one of the light-blocking layer 14B according to the first embodiment.

Here, examples of the respective thickness and width of the through slit 13C and the light-blocking adhesive layer 114 shall be described.

Given the object of applying the through slit 13C to a planar light emitting device that is provided with a switch sheet compatible with a thin electronic device, the width of the through slit 13C that is applied to the planar light emitting device 10 of the present embodiment is preferably 1 mm or less, and more preferably 0.1 mm or more and 1 mm or less, and for example can be formed in a range of 0.1 mm to 0.4 mm. The width of the through slit 13C taking up 0.1 mm or more is due to it being the minimum width that can be processed in die machining of the present circumstances, and when the width is less than this width, the difficulty in terms of accuracy increases in fusion cutting by laser light, not to mention die machining Note that in consideration of the limit of the printing width in dispenser devices that are currently marketed, it is 0.1 mm or more.

Also, in the light-blocking layer 114, the length of the flange portion 114b that covers the upper surface opening edge portion of the through slit 13C (the length along the width direction of the through slit 13C) by a predetermined width can be formed to be 0.05 mm to 0.3 mm, for example, around 0.1 mm.

Furthermore, the ink layer that constitutes the light-blocking layer 114 is formed to have a thickness of 5 to 50 µm, for example, 20 µm.

Furthermore, the thickness of the light-blocking layer 114 may be suitably changed in accordance with the width of the through slit 13C, but in any case it is necessary to leave a space on the inner side of the through slit 13C as a thickness that does not entirely fill in the through slit 13C over the width direction thereof. When the width of the light-blocking layer 114 is less than 5 µm, the adhesiveness and light blocking performance are not sufficient, and when the thickness exceeds 50 µm, the interior-side space is eliminated in the through slit 13C with a narrow width, and so easily exfoliates.

Accordingly, the light-blocking layer 114 forms the recess portion 16 so as to leave a space on the inner side of the through slit 13C without covering the entire through slit 13C, and is formed so as to cover the opening edge portion and the inner wall surface of the through slit 13C, and cover the gap between the bottom portion of the through slit 13C and the upper surface of the switch sheet 20.

Note that in the light-blocking layer 114, the distance from the distal end of one flange portion 114b to the distal end of the other flange portion 114b, that is to say, the printing width by the dispenser device, can be made 0.5 mm or more and 1.5 mm or less. This corresponds to the upper limit and lower limit of the printing width in the case of considering +0.3 mm to +0.5 mm, which is the margin of error of print misalignment due to the dispenser device, with respect to the slit width 0.1 mm to 1.0 mm of the aforementioned through slit 13C.

Next, the switch sheet 20 in which the first light source 11, the second light source 12, the light extracting portion 19, and the pressure-sensitive switch elements 30 are incorporated is the same as that of the first embodiment, respectively, and so the descriptions thereof shall be omitted.

According to the structure of the present embodiment, since the opening edge portion of the through slit 13C of the light guide 13 is covered by the flange portion 114b of the light-blocking layer 114, the inner wall surface of the through slit 13C is covered by the main body portion 114a of the light-blocking layer 114, and the gap portion between the bottom portion of the through slit 13C and the switch sheet 20 (the portion that is extended from the lower portion of the inner wall surface) is covered by the bottom portion 114c of the light-blocking layer 114, there is no leakage of light to the sides of other regions via the through slit 13C portion of the light guide 13.

Also, as shown in FIG. 7A, since the light-blocking layer 114 adheres to the opening edge portion of the through slit 13C and the upper surface of the switch sheet 20 (upper surface of the pressing sheet 25), it is possible to reliably bond the light-blocking layer 114 to both the light guide 13 and the switch sheet 20, and even if thermal stress is repeatedly received due to the installation environment, and even if a repeated pressing force is received due to the switch operation on the switch sheet 20, there is little risk of the light-blocking layer 114 exfoliating from the light guide 13 or the switch sheet 20.

Furthermore, when the bottom portion 114c of the light-blocking layer 114 is provided so as to fill the gap between the bottom portion of the through slit 13C of the light guide 13 and the switch sheet 20, the light-blocking layer 114 closes the gap between the bottom portion of the through slit and the switch sheet 20. Accordingly, it is possible to inhibit the entry of dust to the switch sheet 20 side via the through slit 13C, and it is possible to prevent the mixing in of foreign matter to the switch sheet 20 side, and it is possible to provide a structure with excellent dust control and waterproof performance. Thereby, even in the case of the planar light emitting device 10 of the present embodiment being used over a long period, it is possible to provide a structure that can prevent the infiltration of dust to the switch sheet 20 side, and that can prevent malfunctioning of the switch sheet.

Accordingly, it is possible to provide the planar light emitting device 10 with high dust control and waterproof performance that has a simple structure and is provided with a light-blocking structure that has a superior effect of preventing the leakage of light to adjacent regions by segmenting the light guide 13 into regions, has excellent adhesive strength, and can endure thermal stress due to changes in the environmental temperature and repeated pressing force.

Next, a structure is made in which the light-blocking adhesive layer 14 is formed over the facing inner wall surfaces of the through slit 13C of the light guide 13 and the upper surface of the switch sheet 20 that is close to them (the upper surface of the pressing sheet 25), and the recess portion 16 is formed on the inside of the through slit 13C. In this case, even if the light guide 13 undergoes repeated thermal contraction and thermal expansion so as to narrow or widen the width of the through slit 13C by repetition of thermal expansion of the light guide 13, and as a result repeated thermal stress is made to act on the light-blocking layer 114, since it is possible for the light-blocking layer 114 to easily deform in a manner following the direction of narrowing or widening the recess portion 16, it is a structure that is favorable for stress buffering. For this reason, it is possible to provide a structure in which there is no risk of the light-blocking layer 14 exfoliating from the through slit 13C. Also, since emission along the portion of the through slit 13C of light that is incident on the light guide 13 is eliminated by providing the light-blocking layer 114, there is also no occurrence of leakage light to the outer side of the light guide 13 along the through slit 13C.

Also, when the switch sheet 20 is arranged facing the light guide 13 via the first adhesive material 15 that is provided on the one surface 13a of the sheet-like light guide 13, and the slight gap 18 is provided between the light guide 13 and the switch sheet 20, it is possible to make a structure in which the light guide 13 and the switch sheet 20 are not in close contact. That is to say, the one surface 13a and the other surface 13b of the light guide 13 are in contact with an air layer and not attached to another member that consists of resin. With such a structure, at the first region 13A of the light guide 13, when outgoing light from the first light source 11 is made incident on the one end face 13e of the light guide 13, that incident light reliably propagates through the interior of the light guide 13 while reflecting between the one surface 13a and the other surface 13b of the light guide 13, and the proportion of light that leaks out at portions other than the light-extracting portion 19 is low.

Therefore, since the light that is made incident on the light guide 13 from the first light source 11 is emitted to the outside of the light guide 13 centered on the light-extracting portion 19, the attenuation of the light that propagates through the light guide 13 is restricted to a minimum during that propagation. Therefore, it is possible to guide a sufficient quantity of light in order to produce luminescence through the light-extracting portion 19, over the entire length of the light guide 13. Similarly, in the second region 13B of the light guide 13, when the outgoing light from the second light source 12 is made incident on the one end portion 13f, the attenuation of the light that propagates through the light guide 13 is restricted to a minimum during that propagation. Accordingly, it is possible to guide a sufficient quantity of light in order to produce luminescence through the light-extracting portion 19, over the entire length of the second region 13B of the light guide 13.

Note that similarly to the first embodiment, the light guide 13 in the present embodiment is not limited to a structure that is segmented into two regions, and it may be segmented into three or more regions with arbitrary shapes, and the shape of the through slit that is provided between the regions can be suitably adjusted in accordance with the shapes of the respective regions. Similarly, the shape of the light-blocking adhesive layer that is arranged in the through slit can be suitably adjusted in accordance with the shape of the through slit.

Also, the present embodiment illustrated the planar light emitting device 10 provided with the first light sources 11 that correspond to the first region 13A, and the second light source 12 that corresponds to the second region 13B, but the planar light emitting device of the present invention is not limited thereto. In accordance with the regions of the light guide that is segmented into a plurality, it is possible to install light sources that correspond to each region.

Figure 7C:
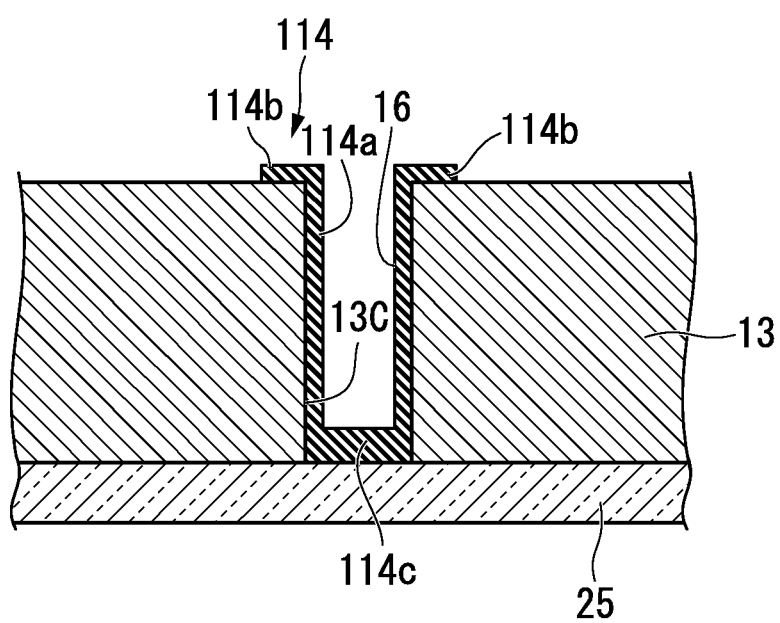
FIG. 7C is an enlarged cross-sectional view that shows another modification of the planar light emitting device according to the second embodiment of the present invention.

Note that the present embodiment is not limited to only the structure described hereinabove. FIG. 7B and FIG. 7C are modifications of the planar light emitting device according to the present embodiment.

As shown in FIG. 7B, the bottom portion 114c of the light-blocking layer 114 is formed on the surface of the second adhesive material 15A that is formed on the surface of a pressing sheet (switch sheet) 25. Ordinarily, a lot of light leaks out from the light guide by the corner portion 13Q. According to the modification shown in FIG. 7B, since the bottom portion 114c of the light-blocking layer 114 is formed on the front face of the pressing sheet 25, the bottom portion 114c of the light-blocking layer 114 is formed in the transverse direction of the corner portion 13Q. Accordingly, since the light-blocking layer is formed thick in the width direction at the corner portion 13Q, a better light-blocking effect is obtained. Note that since the adhesive surface area of the pressing sheet (switch sheet) and the second light-blocking material 15A has increased, the durability is enhanced. Moreover, the formation surface area of the light-blocking layer 14 decreases, and the amount of the light-blocking material used for the light-blocking layer becomes less.

Note that as shown in FIG. 7C, by omitting the adhesive material, it is possible to directly bond the light guide and the switch sheet.

<Method of Manufacturing the Planar Light Emitting Device of the Second Embodiment; One Example>

Hereinbelow, one example of the method of manufacturing the planar light emitting device 10A shown in FIG. 6A to FIG. 7A shall be described with reference to FIG. 8A to FIG. 8D.

First, the concave-convex portion 19A is formed by the aforementioned printing method at the required positions on the one surface 13a of the light guide 13 to form the light-extracting portion 19. The disclosure of these light-extracting portions 19 is omitted in FIG. 8A, but as illustrated in FIG. 6B, the required number of the concave-convex portions 19A are formed at the required positions. Next, the first adhesive material 15 is affixed to the outer periphery of the one surface (rear surface) 13a of the light guide 13, and the second adhesive material 15A that is wider than the through slit is affixed to a portion that includes the planned position for forming the through slit on the one surface 13a of the light guide 13.

Figure 8A:
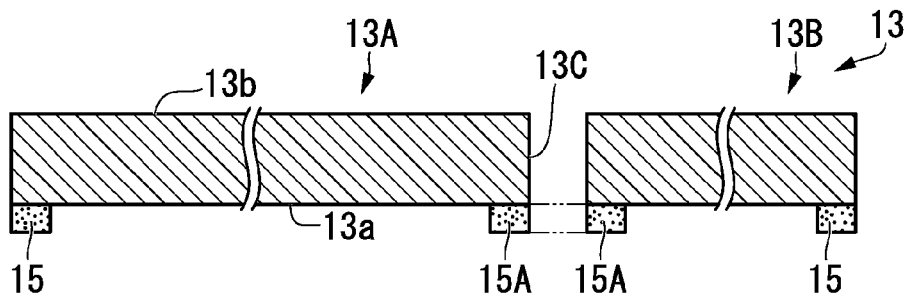
FIG. 8A is a drawing for describing one example of the method of manufacturing the planar light emitting device according to the second embodiment of the present invention, being a cross sectional view that shows the state of the through slit formed in the light guide provided with an adhesive material.

From this state, as shown in FIG. 8A, a laser light such as a $CO_2$ laser light is irradiated on the required position of the light guide 13 to fusion cut the light guide 13 into for example a U-shape in plan view, whereby the through slit 13C is formed. In doing so, the second adhesive material 15A under the through slit 13C is also simultaneously fusion cut by the laser light.

Note, in the same manner as the first embodiment, the through slit 13C may be formed by a punch out process using a die, and the through slit 13C may also be formed by etching. Among these, in the case of adopting the laser fusion cutting method, the processing speed is fast, which is advantageous for mass production, and even for a soft resin such as the aforementioned urethane resin or the like, the fusion cut plane can be made smooth, and so is preferable on the point of being able to obtain a sharp fusion-cut plane.

Figure 8B:
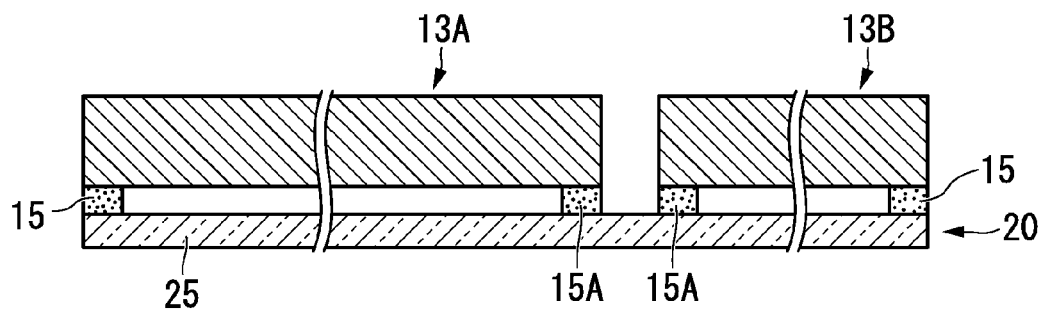
FIG. 8B is a cross-sectional view that shows the state of the switch sheet laminated on the light guide shown in FIG. 8A.
Figure 8C:
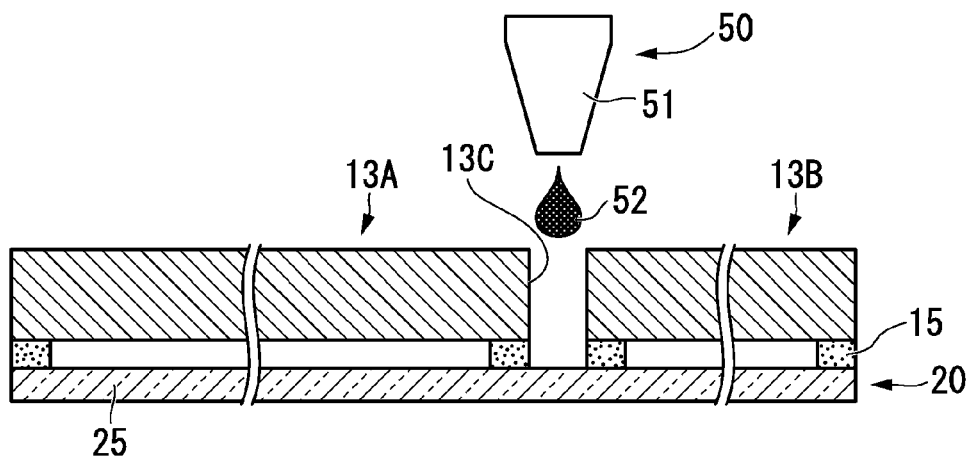
FIG. 8C is a cross-sectional view that shows the state of attempting to form a light-blocking layer in the through slit shown in FIG. 8B using a dispenser.

After forming the through slit 13C, as shown in FIG. 8B, the switch sheet 20 is bonded to the lower surface side of the light guide 13. Note that it is possible to increase or decrease the gap between the light guide 13 and the switch sheet 20 in accordance with the thickness of the first adhesive material 15 and the second adhesive material 15A.

Figure 8D:
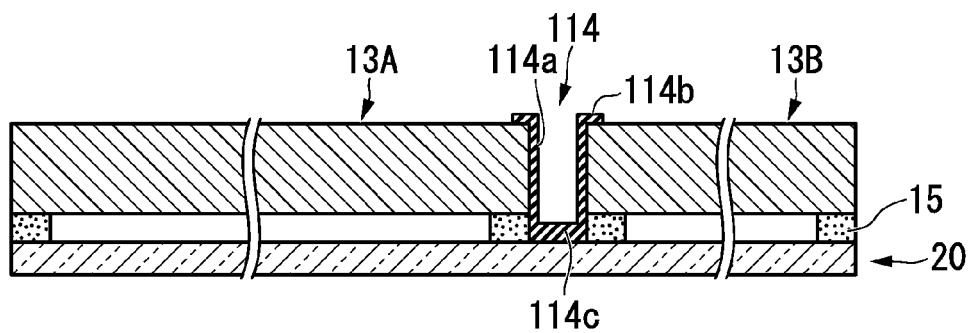
FIG. 8D is a cross-sectional view that shows the state of a light-blocking layer formed on the inside of the through slit and the adhesive layer shown in FIG. 8C.

Then, a dispenser device 50 that is capable of spraying a black or dark ink that has a light-blocking property is used to discharge the required amount of ink 52 from a discharge head 51 of this dispenser device 50 toward the through slit 13C. Since it is possible to accurately control the discharge amount in this dispenser device 50, it is possible by means of discharge control to discharge the required and sufficient amount of ink for covering the inner wall surface of the through slit 13C, covering the opening edge portion of the through slit 13C by a predetermined width, and closing the bottom portion of the through slit 13C without completely filling in the through slit 13C. Accordingly, it is possible to form the light-blocking layer 114 that, as shown in FIG. 8D, covers the inner wall surface of the through slit 13C by the main body portion 114a, covers the opening edge portion of the through slit 13C with the flange portion 114b by a predetermined width, and closes the bottom portion of the through slit 13C by the bottom portion 114c. Note that the flange portion 114b, the main body portion 114a, and the bottom portion 114c are formed continuously. That is to say, the main body portion 114a is continuously extended from the end portion of the flange portion 114b, and the bottom portion 114c is continuously extended from the lower portion (switch sheet side) of the main body portion 114a.

Note that when forming the light-blocking layer 114 by discharging ink, by discharging the ink while moving the discharge head 51 at a predetermined speed (for example, several millimeters per second (mm/sec)) along the lengthwise direction of the through slit 13C, it is possible to apply the ink over the entire lengthwise direction of the through slit 13C. In that case, it is possible to make the distance between the discharge head 51 and the opening of the through slit 13C around 1 mm to several mm, for example, around 1 mm to 3 mm, and it is possible to make the discharge pressure of the ink by the dispenser 50 around, for example, several 10 kPa.

As described above, when forming the light-blocking layer 114 by the dispenser device 50, even if the through slit 13C is a narrow slit, it is possible to form the light-blocking layer 114 of a shape that extends over the inner wall surface, the bottom portion side, and the opening edge portion side of the through slit 13C. Accordingly, it is possible to more reliably and easily form the light-blocking layer 114 compared to a method such as inserting and arranging a separate light-blocking member in the interior of the through slit 13C.

For example, when arranging in the through slit 13C a light-blocking member made of resin having excellent self-support and linearity independently of the through slit 13C, a thickness of around 0.5 mm to 1.8 mm is required. However, in the case of the light-blocking member being the light-blocking layer 114 that consists of ink coated by the above-mentioned dispenser device being 50, since it is possible to reliably form the light-blocking layer 114 with a thickness of several tens of micrometers, for example, around 50 μm within the through slit 13C, it is possible to readily apply it to the through slit 13C having a width of 1 mm or less, and so it can contribute to the miniaturization and weight saving of the light guide 13.

Note that in the present embodiment, the width of the through slit 13C is not limited, and the light-blocking layer 14 may be applied to the through slit 13C having a width of around 1.8 mm. In this case, it is possible to arrange the light-blocking layer 114 that is several tens of micrometers thin on the inner side of the through slit having a width of 1.8 mm.

In the manufacturing method described above, in the case of forming the light-blocking layer 114 by the dispenser device 50 on the through slit 13C of the light guide 13, assuming the thickness of the light guide 13 to be 0.2 mm and the desired width of the through slit 13C to be 0.35 mm, obtaining a thickness of the ink coating portion of 50 μm, and an accuracy of 1 mm or less of the black ink printing width (the flange portion consisting of a pair that forms a coating on the mutually opposed edge portions of the through slit opening portion serving as the total width of the dispenser printing) is readily achievable using a dispenser device that is currently available on the market.

Also, it is conceivable to form the light-blocking layer on the through slit portion by a printing method such as a screen printing method in place of the dispenser device 50. The screen printing method is a method that prints by pushing ink into the through slit while moving a squeegee parallel to the printing surface (in this case, the upper surface of the light guide). Accordingly, it is considered difficult to efficiently apply a force to cause the ink to move in a lateral direction by the squeegee moving horizontally on the printing surface, and difficult to apply a sufficient ink application pressure to the inner wall surface of the through slit and the upper surface of the switch sheet. In contrast, when applying ink with the dispenser device 50 by spraying it on the through slit 13C, as a result of being able to reliably spray and coat the ink to be coated by applying a spray force to any of the opening edge portion and inner wall surface of the through slit 13C, and the upper surface side of the switch sheet 20, it is possible to uniformly coat and form the light-blocking layer 114 on each of these portions with a strong adhesive strength. Therefore, by suitably adjusting the moving speed of the discharge head 51 by the dispenser device 50, and the distance (clearance) between the discharge head 51 and the through slit 13C, it is possible to form the light-blocking layer 114 with a high adhesive strength by efficiently applying the ink while uniformly maintaining the ink application thickness.

<Method of Manufacturing the Planar Light Emitting Device of the Second Embodiment; Another Example>

When forming the through slit 13C in the light guide 13 by laser fusion cutting, the through slit 13C is sometimes cut in a cross-sectional V-shape by the irradiation state of the laser light.

In this kind of case, a light-blocking layer with a cross-sectional shape that matches with the shape of the through slit that has been laser fusion cut is formed. One example of the manufacturing method in that case shall be described hereinbelow based on FIG. 9A to FIG. 9D.

Figure 9A:
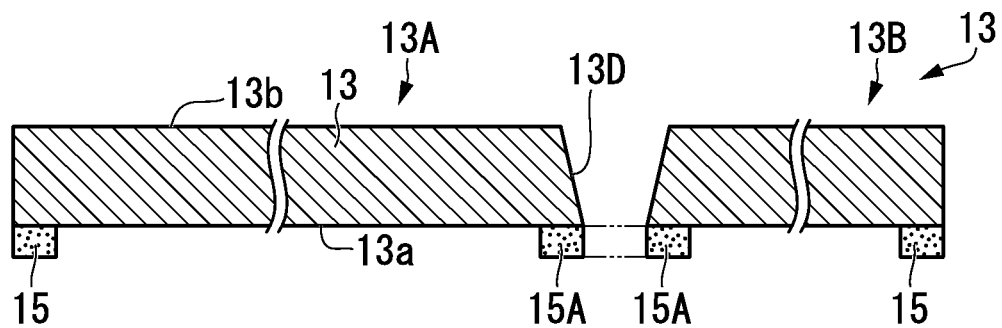
FIG. 9A is a drawing for describing another example of the method of manufacturing the planar light emitting device according to the second embodiment of the present invention, being a cross sectional view that shows the state of the through slit formed by laser light in the light guide provided with an adhesive material.

The manufacturing method shown in FIG. 9A to FIG. 9D differs from the manufacturing method described based on FIG. 8A to FIG. 8D on the point of the transverse cross-sectional shape of the through slit that is formed by partially laser fusion cutting the light guide 13 with laser light having an approximate V shape. FIG. 9A shows a through slit 13D with an approximate V-shape in transverse cross section that is formed by fusion cutting with a laser light.

In the light guide 13 in which this through slit 13D is formed, prior to the laser fusion cutting with the laser light, the first adhesive material 15 is affixed to the outer peripheral edge portion on the one surface 13a side of the light guide 13, and an adhesive material that is wider than the through slit 13D is affixed to the formation position of the through slit 13D and the surrounding portion thereof. Since the through slit 13D is formed by laser fusion cutting, the second adhesive material (second spacer) 15A is provided at the bottom portion side of the through slit 13D as shown in FIG. 9A.

Figure 9B:
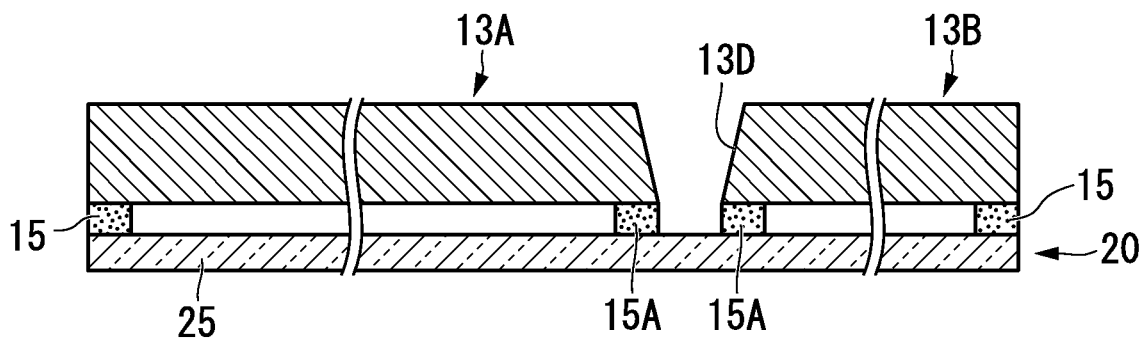
FIG. 9B is a cross-sectional view that shows the state of the switch sheet laminated on the light guide shown in FIG. 9A.
Figure 9C:
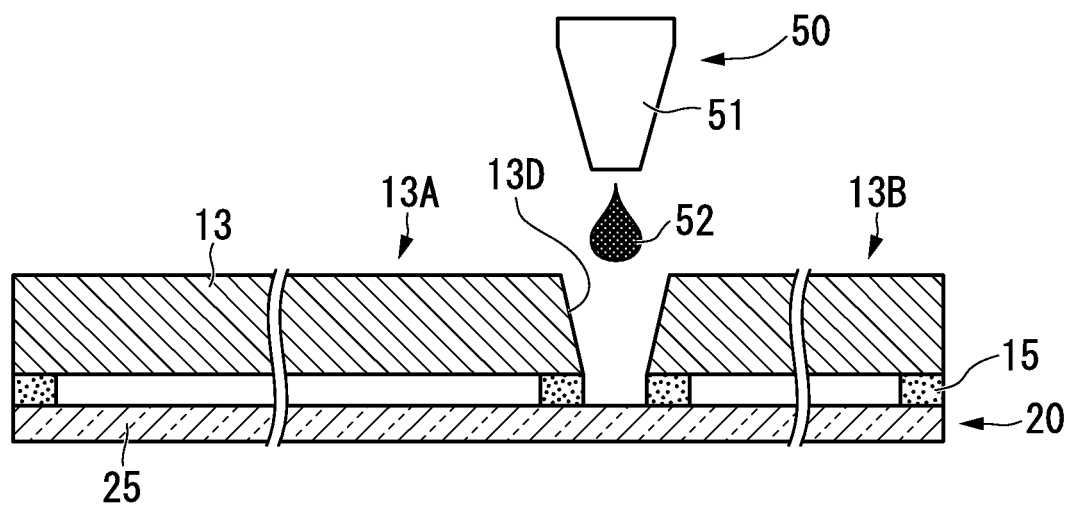
FIG. 9C is a cross-sectional view that shows the state of attempting to form a light-blocking layer in the through slit shown in FIG. 9B using a dispenser.
Figure 9D:
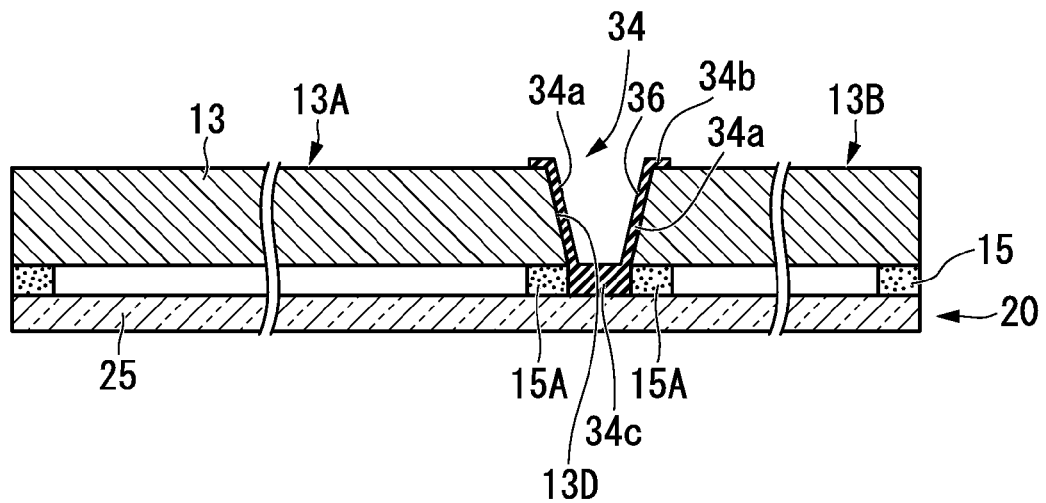
FIG. 9D is a cross-sectional view that shows the state of a light-blocking layer formed on the inside of the through slit and the adhesive layer shown in FIG. 9C.

Subsequently, as shown in FIG. 9B, the switch sheet 20 is affixed to light guide 13 via the first adhesive material 15 and the second adhesive material 15A. Then, as shown in FIG. 9C, the required amount of ink 52 is sprayed out from the discharge head 51 of the dispenser device 50 toward the through slit 13D. Thereby, since it is possible to discharge the ink of a necessary amount for covering the inner wall surface of the through slit 13D, covering the opening edge portion of the through slit 13D by a predetermined width, and closing the bottom portion of the through slit 13D, it is possible to form the light-blocking layer 34 that covers the inner wall surface of the through slit 13D by the main body portion 34a, covers the opening edge portion of the through slit 13C with the flange portion 34b by a predetermined width, and closes the bottom portion of the through slit 13D with the bottom portion 34c, as shown in FIG. 9D. By the above, it is possible to manufacture the planar light emitting device in which the light guide 13 and the switch sheet 20 are laminated.

In the manufacturing method described based on FIG. 8A to FIG. 8D, and FIG. 9A to FIG. 9D, the hole portion is formed by laser fusion cutting in the second adhesive material (second spacer) 15A, but it is possible to manufacture the light guide by processing so as not to laser fusion cut the second adhesive material 15A. That is to say, it is possible to manufacture the planar light emitting device shown in FIG. 7B without performing laser fusion cutting in the second adhesive material 15A.

For example, after forming the through slit portion 13C by laser fusion cutting in the light guide 13, the light guide 13 is affixed to the switch sheet 20 after affixing the first adhesive material 15 and the second adhesive material 15A. Thereafter, the light-blocking layer 114 or the light-blocking layer 34 may be formed by discharging ink from the discharge head 51 as described in FIG. 8A to FIG. 8D and FIG. 9A to FIG. 9D. In this case, the bottom portion 114c of the light-blocking adhesive layer 114 or the bottom portion 34c of the light-blocking layer 34 that is formed after pressing is adhered to the upper surface of the second adhesive material (second spacer) 15A, and not adhered to the upper surface of the switch sheet 20.

Also, in the case of performing the laser fusion cutting after bonding the second adhesive material 15A to the light guide 13, the laser fusion cutting operation may be stopped at the bottom surface position of the light guide 13 without laser fusion cutting the second adhesive material 15A, and from the state of the second adhesive material 15A remaining as is without fusion cutting the second adhesive material 15A, the light-blocking layer 114 or the light-blocking layer 34 may be formed by discharging ink from the discharge head 51 as described in FIG. 8A to FIG. 8D or FIG. 9A to FIG. 9D.

Either case leads to a structure in which the bottom portion 114c of the light-blocking layer 114 or the bottom portion 34c of the light-blocking layer 34 is bonded to the upper surface of the second adhesive material (second spacer) 15A on the switch sheet 20 as shown in FIG. 7B.

In the case of selecting the structure by these manufacturing methods, since the second adhesive material 15A remains behind as shown by the two-dot chain line in FIG. 8A and FIG. 9A, without the hole portion being formed in the second adhesive material 15A as shown in FIG. 8A to FIG. 8D or FIG. 9A to FIG. 9D, the light-blocking layer 114 or the light-blocking layer 34 is formed by bonding the bottom portion 114c of the light-blocking layer 114 or the bottom portion 34c of the light-blocking layer 34 to this portion, and so the object of the present invention is attained.

That is to say, as described in the preceding embodiments, a structure is possible that provides the light-blocking adhesive layer 114 and 34 by forming the bottom portion 114c and 34c on the upper surface of the switch sheet 20, and a structure is possible that provides the light-blocking adhesive layer 114 and 34 by bonding the bottom portion 114c and 34c to the surface of the second adhesive material (second spacer) 15A that is on the switch sheet 20, and it is possible to attain the object of the present invention in either case.

<Examples>

Using a plurality of light guides made of urethane resin with a thickness of 0.2 mm, the first adhesive material is affixed to the outer peripheral edge portion of the rear face of each guide, and the second adhesive material is attached to the portion of the formation position of the through slit. By forming through slits with a fusion cut width of 0.35 mm by a $CO_2$ laser in these light guides, a plurality of samples are obtained. The variation, a, in the groove width of the through slit is 0.01 mm. Since the $CO_2$ laser fusion cut the light guide at its focal point position, the variation in the groove width is sufficiently small, indicating it is a level allowing mass production.

The switch sheet is affixed to the light guide in which this through slit is formed. The adhesive materials that are affixed to the peripheral edge portion of the light guide and the bottom portion opening edge portion of the through slit respectively have a thickness of 0.05 mm, and the thickness of the switch sheet that is affixed by them is 70 μm.

After affixing the switch sheet, the light guide is installed in a horizontal manner, and the clearance between the opening portion of the through slit and the discharge head is set to 1 mm. Carbon ink (black ink) is then discharged and applied from the dispenser device from above the opening portion of the through slit. The traveling speed of the discharge head is set to 3 mm/sec along the lengthwise direction of the through slit, and the ink discharge pressure is set to 40 kPa.

Figure 10:
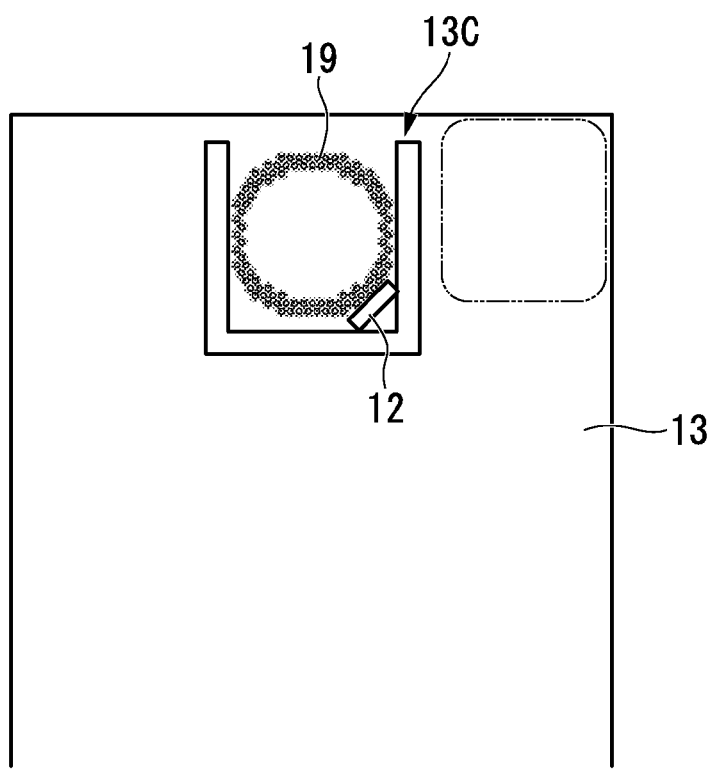
FIG. 10 is a schematic drawing for describing the result of a light-blocking test that is performed using the planar light emitting device.
Figure 11:
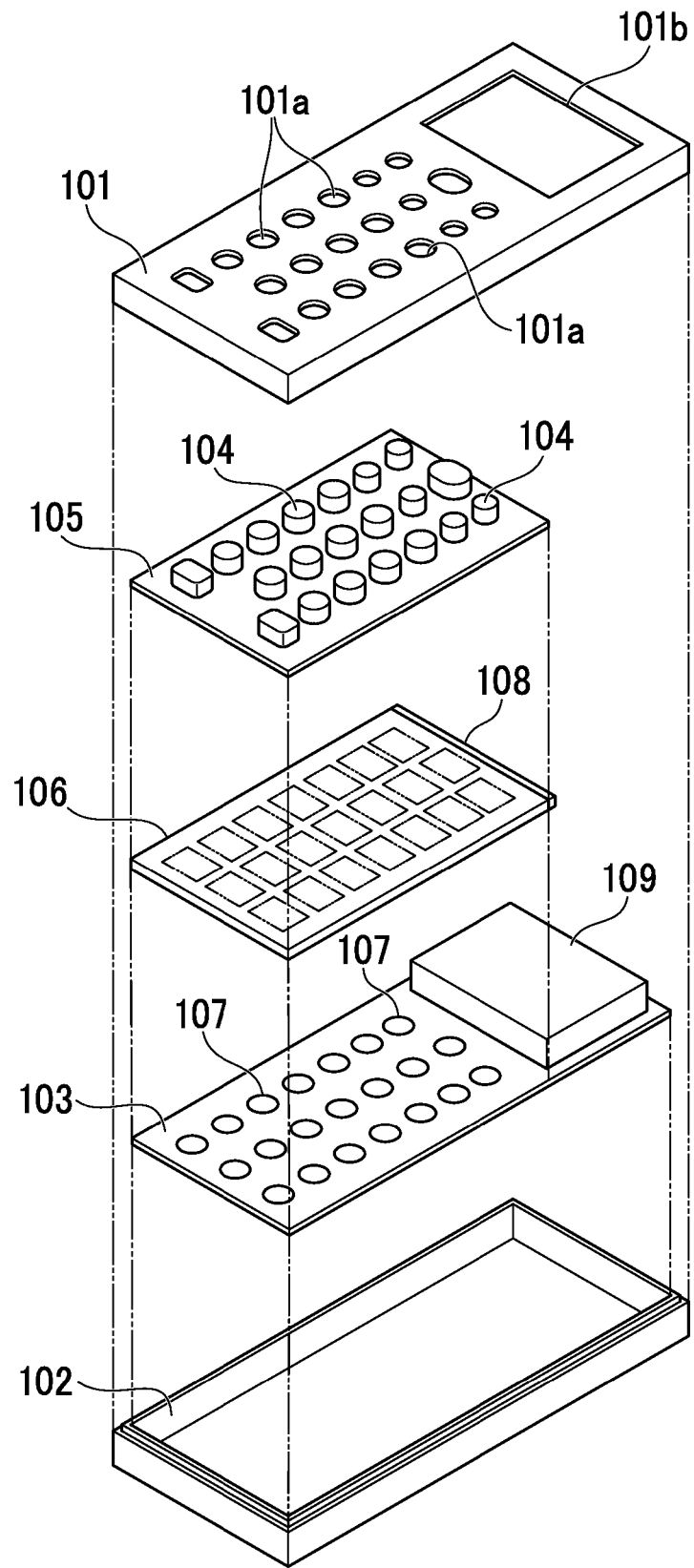
FIG. 11 is an exploded perspective view that shows a first example of a conventional planar light emitting device.
Figure 12:
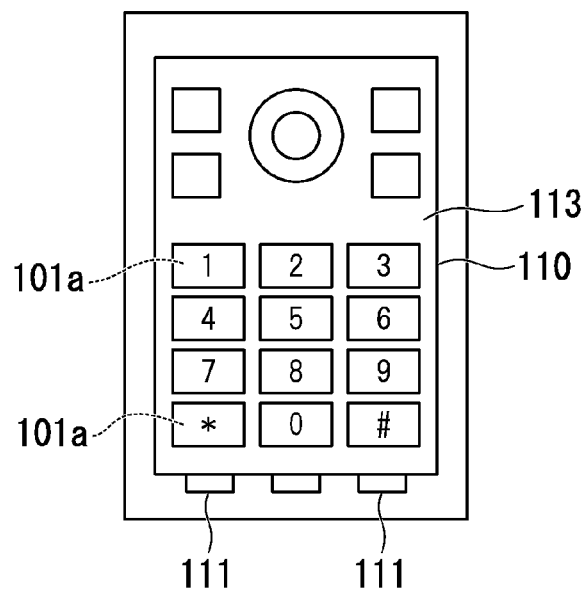
FIG. 12 is a plan view that shows a second example of a conventional planar light emitting device.
Figure 13:
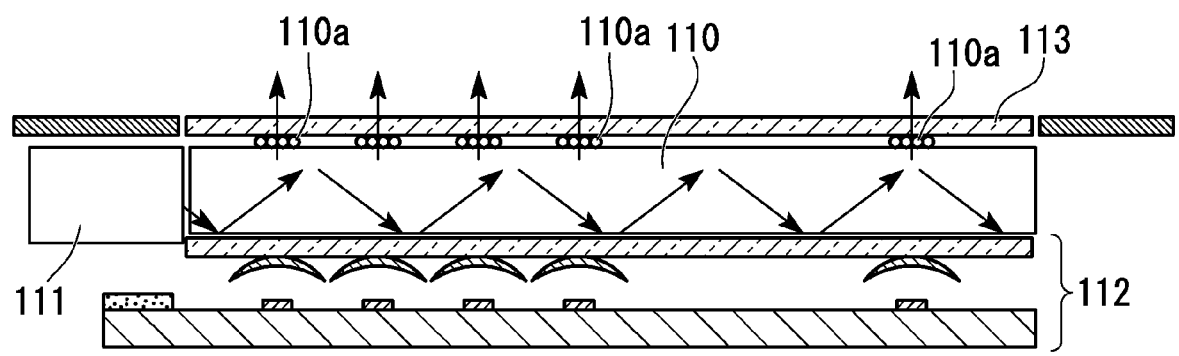
FIG. 13 is a cross-sectional view of the planar light emitting device shown in FIG. 12.
Figure 14A:
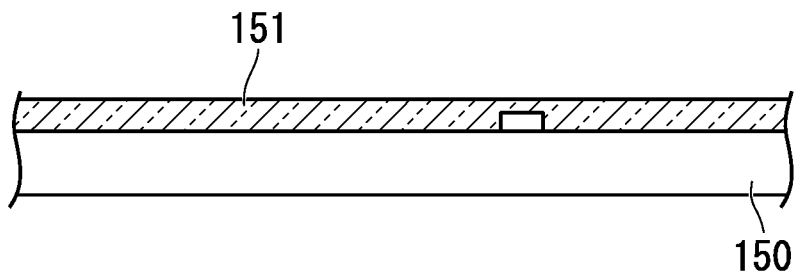
FIG. 14A shows one example of a method of manufacturing a light guide that is applied to another example of a conventional planar light emitting device, being a cross-sectional view that shows the state where a resin film is formed.
Figure 14B:
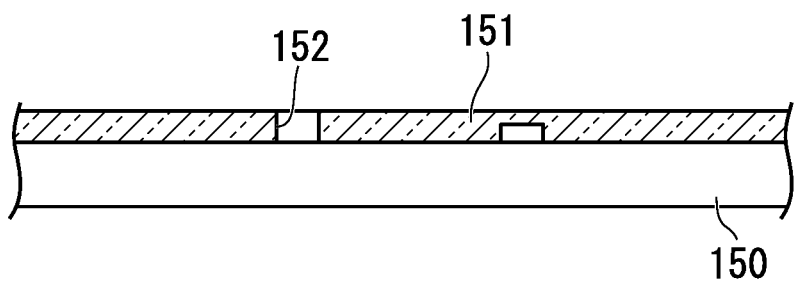
FIG. 14B is a cross-sectional view that shows the state of a slit formed in the resin film shown in FIG. 14A.
Figure 14C:
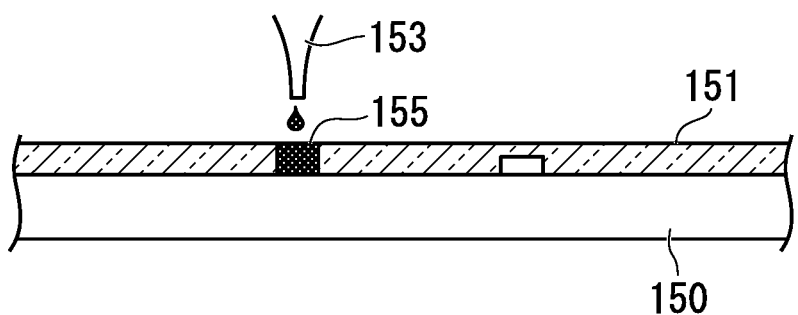
FIG. 14C is a cross-sectional view that shows the state of a black resin being filled in the slit of the resin film shown in FIG. 14B.
Figure 14D:
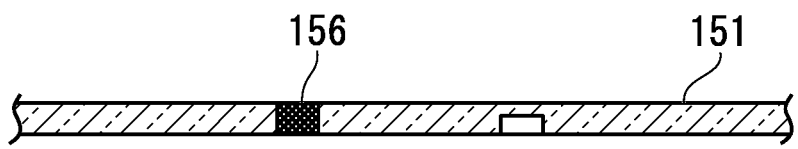
FIG. 14D is a cross-sectional view that shows the light-blocking portion that has been formed in the slit of the resin film shown in FIG. 14C.

Regarding the light-blocking layer that is formed by the aforementioned conditions, as shown in FIG. 10, a test is carried out to measure the light blocking rate by applying it to the light guide of the operation switch portion of a mobile phone. The examples according to the present invention have a structure in which a through slit having a U-shape in plan view (slit width 0.1 mm or 0.35 mm, length of U-shape portion 18 mm×18 mm) is provided in the middle to one side of a light guide (horizontal width 35 mm, length 42 mm, thickness 0.2 mm). By discharging carbon ink (black ink) from the dispenser device into the through slit, the light-blocking layer is formed.

In contrast to this, on the inside of the U-shaped through slit, a filler made of silicon, a filler made of black PET, or a filler consisting of a material that mixes black filler in a polyurethane resin are respectively prepared, and a light-blocking layer that is formed by embedding these fillers in the through slit is formed, whereby samples of comparative examples are made. An LED is installed as a second light sources at the inside corner portion of the through slit of each of the samples, and a test is carried out to see how much light leakage occurred to the outside of the through slit. The light-blocking layer that is formed from the dispenser device so as to cover the through slit portion has a thickness of 5 to 50 μm, and the width of the pair of flange portions formed at both opening edge portions of the through slit (the length of one in the lateral direction) is 0.1 mm.

[Tests]

An environmental durability test, a pressing resistance test, and a light-blocking rate measurement test are performed on a plurality of light guide samples manufactured under the aforementioned conditions.

portion that completely fills the through slit, and measurement of the light-blocking rate is performed. Also, a test similar to the light-blocking rate measurement test that is performed on the preceding examples is performed on each comparative sample to measure the light-blocking rate. These test results are also shown in Table 3.

TABLE 3

| | Light-Blocking Layer Material | Structure | Ink Layer Thickness (μm) | One-sided Length in Lateral Direction Covering Opening Edge Portion (mm) | Slit Width (mm) | Environmental Durability Test 25° C. 9 hours 55° C. 9 hours in 95% humidity 6 days | Repeated Pressing Test 0.8 kg, 1 million Strokes | Reflected Light Shining Along Groove | Light Blocking Rate |
|---|---|---|---|---|---|---|---|---|---|
| Example 24 | Carbon Ink | Concave structure (two-sided shielding) | 40 | 0.1 | 0.1 | F | G | None | 95% or more (G) |
| Example 25 | | | 30 | 0.1 | 0.1 | | | | |
| Example 26 | | | 20 | 0.1 | 0.1 | | | | |
| Example 27 | | | 10 | 0.1 | 0.1 | | | | |
| Example 28 | | | 5 | 0.1 | 0.1 | | F | | 90% (F) |
| Example 29 | | | 50 | 0.1 | 0.35 | | F | | 95% or more (G) |
| Example 30 | | | 40 | 0.1 | 0.35 | | G | | |
| Example 31 | | | 30 | 0.1 | 0.35 | | | | |
| Example 32 | | | 20 | 0.1 | 0.35 | | | | |
| Example 33 | | | 10 | 0.1 | 0.35 | | | | |
| Example 34 | | | 5 | 0.1 | 0.35 | | F | | 90% (F) |
| Comparative Example 4 | Carbon ink | Structure that fills in all | 50 | 0.1 | 0.1 | NG | NG (ink peels from interior) | None | 95% or more (G) |
| Comparative Example 5 | Silicon | Structure that fills in all | — | | | NG | Peels in 300,000 times | Occurs | 90% (F) |
| Comparative Example 6 | PET | | — | | | NG | Peels in 300,000 times | | |
| Comparative Example 7 | Black filler mixed in polyurethane resin | | — | | | NG | Peels in 300,000 times | | |

Definitions in environmental durability test
F: 144 hours or more
NG: 100 hours or less
Definitions in repeated pressing test
G: 1 million times or more
F: 300,000 to 1 million times
NG: 10,000 times or less As the environmental durability test, a test is performed that repeatedly for eight times alternated exposure to an ordinary temperature maintained for 540 minutes (9 hours) and a high temperature, high humidity maintained for 540 minutes (9 hours), for an ordinary-temperature holding state (25° C., humidity 95%) and a high temperature, high humidity environment (55° C., humidity 95%). As a result of this environmental durability test, the light guide repeatedly undergoes thermal expansion and thermal contraction, and thermal stress is repeatedly impressed on the portion of the light-blocking layer.

Next, a repeated pressing durability test is conducted on the aforementioned samples that repeatedly applied in 3 cycles/second a load of 0.8 kg with a metal piston rod having a diameter of 1 cm directly from above the center portion of the through slit having a U-shape in plan view.

Next, an LED is illuminated on each sample, and the light-blocking rate is measured.

The light blocking rate is indicated by 1−(total luminance value at the region that should block light:total luminance value of the leakage light)/(total luminance value of the entire area of the light guide) [%].

Next, for comparison, when manufacturing the aforementioned samples, a similar environmental durability test and a repeated pressing durability test are performed on comparative examples in which a silicon resin that is dyed black is filled in the through slit and cured, to form a light-blocking From the result shown in Table 3, in the structure according to the present embodiment, it is possible to obtain excellent results in all of the environmental durability test, the repeated pressing durability test, and the light-blocking rate test.

Specifically, it is proven that each sample according to the present embodiment withstands repeated keystrokes of 300,000 to 1 million times or more, and any of the light-blocking layers manufactured by the aforementioned manufacturing method has excellent repeated pressing durability.

In each sample, as a result of measuring the luminance value of each rectangular measurement area shown by the two-dot chain line in FIG. 10, and performing a luminance measurement on the outer side of the light-blocking layer formation portion with a U-shape in plan view, each light-blocking rate is 90% or more, and so it is possible to obtain an extremely good result. In particular, in the example with an ink layer thickness of 10 to 40 μm, it is possible to obtain an excellent characteristic of a 95% light-blocking rate.

In the samples of Comparative Examples 5, 6, and 7, the light-blocking rate is good, but reflected light that leaks to the outer surface of the light guide occurred along the through slit. In the case of a filler being pushed into the through slit, inevitably the inner wall surface of the through slit cannot be completely covered, with slight gaps being produced. Therefore, this leakage is considered due to leakage light originating in the space of that gap being produced along the through slit.

In the samples of Comparative Examples 4, 5, 6, and 7, there is exfoliation in 100 hours or less in the environmental durability test, but in all of the samples according to the present embodiment, there is no exfoliation even after the passage of 144 hours or more. Furthermore, in the samples of Comparative Examples 4, 5, 6, and 7, after 10 hours had elapsed, the light guide made of urethane resin began to discolor. This is considered due to heat dissipation worsening and degradation of the urethane resin that constitutes the light guide progressing when the entire through slit is covered with resin. When discoloration of the urethane resin occurs, there is a possibility that the transmission rate of the light as a light guide may fall.

Regarding the thickness of the ink layer from the test results shown in Table 3, good results are obtained in the range of 5 to 40 μm, and good results are obtained both in the case of a through slit width of 0.1 mm, and in the case of a through slit width of 0.35 mm.

As described above, the planar light emitting device according to the embodiment of the present invention is a planar light emitting device that is provided with a light source, a sheet-like light guide that is arranged in the vicinity of this light source to guide light from the light source to one end face side thereof, and guide the light from the light source in the plane direction thereof (thickness direction), and a switch sheet that is arranged on one surface side of this light guide, in which a through slit for blocking light is formed in a portion of the light guide, the light guide is segmented into a plurality of light emitting regions via this through slit, and a light-blocking adhesive layer, which consists of a hot melt layer and a light-blocking layer that extend over the opening edge portion and inner wall surface of the through slit of the light guide and over one surface of the switch sheet that is close to this inner wall surface, adheres to the opening edge portion of the through slit and the switch sheet via the hot melt layer, and is formed in a state that leaves a space on the interior side of the through slit so as to cover the inner wall surface with the light-blocking layer.

The planar light emitting device according to the embodiment of the present invention is a planar light emitting device that is provided with a light source, a sheet-like light guide that is arranged in the vicinity of this light source to guide light from the light source to one end face side thereof, and guide the light from the light source in the plane direction thereof, and a switch sheet that is arranged on one surface side of the light guide via a spacer, in which a through slit for blocking light is formed in a portion of the light guide, the light guide is segmented into a plurality of light emitting regions via this through slit, and a light-blocking adhesive layer, which consists of a hot melt layer and a light-blocking layer that extend over the opening edge portion and inner wall surface of the through slit of the light guide, and over one surface of the spacer on the switch sheet that is close to this inner wall surface, adheres to the opening edge portion of the through slit and the spacer on the switch sheet via the hot melt layer, and is formed in a state that leaves a space on the interior side of the through slit so as to cover the inner wall surface with the light-blocking layer.

In the embodiment of the present invention, the light-blocking adhesive layer is formed over the mutually facing inner wall surfaces of the through slit of the light guide and the one surface of the switch sheet, or a spacer thereon, that is close to the inner wall surfaces, and a recess portion that is partitioned by the light-blocking adhesive layer is formed on the inner side of the through slit.

In the planar light emitting device according to the embodiment of the present invention, the bottom portion of the light-blocking adhesive layer is provided so as to fill the space between the through slit bottom portion of the light guide and the switch sheet or the spacer thereon.

In the planar light emitting device according to the embodiment of the present invention, the hot melt layer of the light-blocking adhesive layer is bonded to the inner wall surface of the through slit of the light guide, in addition to the switch sheet and the through slit opening edge portion of the light guide.

In the planar light emitting device according to the embodiment of the present invention, the width of the through slit is in a range of 0.1 mm to 1 mm.

In the method of manufacturing the planar light emitting device according to the embodiment of the present invention, when manufacturing the planar light emitting device disclosed above, after forming the through slit in the light guide, bonding the light guide with the switch sheet, and after temporarily bonding at the opening portion of the through slit the light-blocking adhesive material that is provided with the hot melt layer and the light-blocking layer so as to cover this opening portion, pushing in a hot press jig that has a convex portion that corresponds with the width and depth of the through slit from the outer side of the opening portion, and pushing it into the through slit while thermally deforming the light-blocking adhesive material that has the hot melt layer and the light-blocking layer, and bonding the hot melt layer to the opening edge portion of the light guide and the switch sheet to forms the light-blocking adhesive layer.

In the method of manufacturing the planar light emitting device according to the embodiment of the present invention, when manufacturing the planar light emitting device disclosed above, after forming the through slit in the light guide, bonding the light guide with the switch sheet via a spacer, and after temporarily bonding at the opening portion of the through slit the light-blocking adhesive material that is provided with the hot melt layer and the light-blocking layer so as to cover this opening portion, pushing in a hot press jig that has a convex portion that corresponds with the width and depth of the through slit from the outer side of the opening portion, and pushing it into the through slit while thermally deforming the light-blocking adhesive material that has the hot melt layer and the light-blocking layer, and bonding the hot melt layer to the opening edge portion of the light guide and the spacer on the switch sheet to form the light-blocking adhesive layer.

The method of manufacturing the planar light emitting device according to the embodiment of the present invention forms the recess portion that is partitioned by the light-blocking adhesive layer between the mutually facing inner wall surfaces of the through slit when forming the light-blocking adhesive layer by pushing in the hot press jig that has the convex portion to cause the light-blocking adhesive material to undergo thermal deformation and thereby bond to interior of the through slit.

The method of manufacturing the planar light emitting device according to the embodiment of the present invention irradiates laser light on the through slit formation position, when forming the through slit in the light guide.

The method of manufacturing the planar light emitting device according to the embodiment of the present invention forms the flange portion of the light-blocking adhesive layer that is bonded to the opening edge portion of the through slit portion by using a hot press jig that is provided with auxiliary pressing portions on both sides of the convex portion in the width direction as the hot press jig, and pressing the light-blocking adhesive material that is positioned at the opening edge portion of the through slit in the state of convex portion being inserted in the through slit.

The planar light emitting device according to the embodiment of the present invention is a planar light emitting device that is provided with a light source, a sheet-like light guide that is arranged in the vicinity of this light source to guide light from the light source to one end face side thereof, and guide the light from the light source in the plane direction thereof, and a switch sheet that is arranged on one surface side of this light guide, in which a through slit for blocking light is formed in a portion of the light guide, the light guide is segmented into a plurality of light emitting regions via this through slit, and a light-blocking layer that is formed by ink application is provided so as to extend over the opening edge portion and inner wall surface of the through slit of the light guide and the surface of the switch sheet that is close to this inner wall surface, and so as to leave a space on the interior side of the through slit.

In the planar light emitting device according to the embodiment of the present invention, a first spacer is inserted between the light guide and the switch sheet whereby a gap is formed therebetween, and a second spacer is arranged between the bottom portion peripheral edge of the through slit and the front face of the switch sheet whereby a gap is formed at the base portion side of the through slit.

In the planar light emitting device according to the embodiment of the present invention, the bottom portion of the light-blocking layer is arranged so as to fill in the gap between the light guide and the switch sheet that is positioned on the inner side of the second spacer.

The planar light emitting device according to the embodiment of the present invention is a planar light emitting device that is provided with a light source, a sheet-like light guide that is arranged in the vicinity of this light source to guide light from the light source to one end face side thereof, and guide the light from the light source in the plane direction thereof, and a switch sheet that is arranged via a spacer on one surface side of this light guide, in which a through slit for blocking light is formed in a portion of the light guide, the light guide is segmented into a plurality of light emitting regions via this through slit, and a light-blocking layer that is formed by ink application is provided so as to extend over the opening edge portion and inner wall surface of the through slit of the light guide and the surface of the spacer on the switch sheet that is close to this inner wall surface, and so as to leave a space on the interior side of the through slit.

In the planar light emitting device according to the embodiment of the present invention, the light-blocking layer that extends over the mutually facing opening edge portions and the mutually facing inner wall surfaces of the through slit of the light guide, and the front face of the switch sheet that is close to this inner wall surface or the front face of the spacer thereon is bonded so as to cover the opening edge portion and inner wall surface of the through slit, and the front face of the switch sheet that is positioned at the bottom portion side of the through slit or the front face of the spacer thereon, a recess portion that is partitioned by the light-blocking layer is formed on the inner side of the opening portion of the through slit, and the bottom portion of the light-blocking layer is provided so as to fill in the space between the bottom portion of the through slit of the light guide and the front face of the switch sheet or the front face of the spacer thereon.

In the method of manufacturing the planar light emitting device according to the embodiment of the present invention, when manufacturing any of the planar light emitting devices disclosed above, after forming the through slit in the light guide, bonds the light guide with the switch sheet, applies ink of a light-blocking material to the inner portion side of the through slit with a dispenser from the outer side of the opening portion of the through slit, and forms the light-blocking layer so as to extend over the opening edge portion and inner wall surface of the through slit of the light guide, and over the front face of the switch sheet that is close to the inner wall surface or the front face of the spacer thereon.

The method of manufacturing the planar light emitting device according to the embodiment of the present invention inserts a first spacer between the outer peripheral portion of the light guide and the switch sheet, and inserts a second spacer between the bottom portion peripheral edge of the through slit and the front face of the switch sheet, whereby a gap is formed between the light guide and the switch sheet, pastes both together, and by application of an ink of a light-blocking material forms a light-blocking layer that is bonded to the opening edge portion and the inner wall surface of the through slit so as to fill the space between the through slit bottom portion of the light guide and the front face of the switch sheet or the front face of the spacer thereon.

The embodiment of the present invention has a light-blocking adhesive layer that has a hot melt layer and a light-blocking layer that extend over the opening edge portion and inner wall surface of the through slit that penetrates the light guide and the one surface of the switch sheet or the spacer thereon that is close to the inner wall surface, bonds the light-blocking adhesive layer to the opening edge portion of the through slit and the switch sheet or the spacer thereon by the hot melt layer, and the light-blocking layer covers the inner wall surface of the through slit. Accordingly, it is possible to minimize as much as possible the proportion of light that leaks to an adjacent region via the through slit, and it is possible to provide a structure in which hardly any light leaks to an adjacent region via the through slit portion. Also, according to the embodiment of the present invention, there is an effect of being able to prevent light leaking to the outside of the light guide from the through slit portion.

The embodiment of the present invention is a structure that divides a sheet-like light guide into a plurality of regions via a through slit, provides a light source in each region, so that even if it becomes a structure that illuminates each region with separate light sources, it is possible to make a structure in which no light leakage occurs from the portion of the through slit.

Also, it is possible to firmly connect the light-blocking adhesive layer to both of the light guide and the switch sheet or to both of the light guide and the spacer on the switch sheet by the hot melt layer, and so even if subjected to thermal stress accompanying repeated temperature fluctuations or a repeated pressing force accompanying a switch operation on the switch sheet, it is possible to provide a structure in which there is no risk of the light-blocking adhesive layer exfoliating from the light guide and the switch sheet or the spacer thereon. Since the light-blocking adhesive layer is provided in a state of a space being left within the through slit, it is possible to make a structure that has good heat dissipation by preventing heat from building up around the formation portion of the heat-blocking adhesive layer, and it is possible to make a structure in which there is little risk of discoloring or heat degradation in the light guide around the through slit portion. Moreover, with this structure, even if the light guide undergoes repeated thermal contraction and thermal expansion so as to narrow or widen the width of the through slit due to repeated thermal expansion of the light guide, causing repetitive stress to act on the light-blocking layer, since the light-blocking layer can readily deform in a direction that narrows or widens the space, it becomes a structure that is advantageous for stress cushioning.

The light-blocking adhesive layer that is provided with a hot melt layer and a light-blocking layer is provided as something that covers the through slit, and it is possible to readily press the hot melt layer into the through slit portion by a hot press process using a hot press jig or the like. For that reason, the structure according to the embodiment of the present invention can be achieved with extreme ease by a hot press process.

Next, since the light-blocking adhesive layer is made into a structure that is provided with at least the two layers of a hot melt layer and a light-blocking layer, strong adhesive force is imparted to the hot melt layer, and excellent light-blocking performance is imparted to the light-blocking layer, whereby it is possible to allocate a function to each layer. Accordingly, it is possible to realize a light-blocking adhesive layer that satisfies at a sufficiently high level both the adhesive force that is imparted to the hot melt layer and the light-blocking performance that is imparted to the light-blocking layer.

Accordingly, it is possible to provide a planar light emitting device that is provided with a strong light-blocking structure that has a simple structure, has a high effect of preventing light leakage to adjacent regions is high, has excellent adhesive force, and is capable of withstanding thermal stress that accompanies a repeated temperature fluctuations and a repeated pressing force during switch operation.

Next, when a light-blocking adhesive layer is formed along the mutually facing inner wall surfaces of the through slit of the light guide and the front face of the switch sheet that is close to them or the front face of the spacer thereon, and a recess portion is formed in the light-blocking adhesive layer on the inner side of the through slit, even if the light guide undergoes repeated thermal contraction and thermal expansion so as to narrow or widen the width of the through slit due to repeated thermal expansion of the light guide, causing repetitive stress to act on the light-blocking adhesive layer, since the light-blocking adhesive layer can readily deform in a direction that narrows or widens the recess portion, it becomes a structure that is advantageous for stress cushioning.

For example, even in the case of undergoing repeated expansion and contraction due to keystrokes, since the light-blocking layer can easily deform to follow such expansion and contraction due to the presence of the recess portion, a structure results that is advantageous in terms of resistance to a repeated expansion and contraction action from keystrokes and the like.

Also, when a light-blocking adhesive layer is formed so as to extend over the mutually facing inner wall surfaces of the through slit of the light guide and the front face of the switch sheet that is close to them or the front face of the spacer thereon, it is possible to reliably bond and fix the light-blocking adhesive layer via the hot melt layer at the three locations of both side portions of the opening edge portion of the through slit, and the front face of the switch sheet that is sandwiched by the both side portions and positioned to the lower side of them, or the front face of the spacer thereon. Accordingly, it is possible to support the light-blocking adhesive layer at three points in transverse cross-sectional view, and it is possible to provide a planar light emitting device that is provided with a light-blocking adhesive layer that can withstand the thermal stress from repeated temperature fluctuations and the repeated pressing force accompanying switch operation on the switch sheet, and that resists exfoliation.

Next, the bottom portion of the light-blocking adhesive layer is provided so as to fill the space between the bottom portion of the through slit of the light guide and the switch sheet, or between the through slit bottom portion and the spacer on the switch sheet. Thereby, since the light-blocking adhesive layer closes the gap between the through slit bottom portion and the switch sheet or the spacer on the switch sheet, it is possible to inhibit the entry of dust to the switch sheet side via the through slit, it is possible to prevent the mixing in of foreign matter to the switch sheet side, and the dust control and waterproof performance are excellent. Thereby, it is possible to provide a structure that, even in the case of the planar light emitting device of the present invention being used over a long period, can prevent the infiltration of dust to the switch sheet side, and can prevent malfunctioning of the switch sheet.

Furthermore, in the case of making a structure that bonds the hot melt layer to the inner wall surface of the through slit, in addition to the opening edge portions of the through slit and the one face of the switch sheet or the spacer thereon, it is possible to provide a planar light emitting device that is provided with a light-blocking adhesive layer with a stronger bonding structure.

In addition, when the light-blocking adhesive layer that is provided with the hot melt layer and the light-blocking layer is made a structure that is formed by being pressed in the through slit by a hot press process, it is possible to provide a planar light emitting device that is provided with a light guide that has a light-blocking structure in which the light-blocking adhesive layer resists exfoliation even in the case of an extremely narrow through slit of 1 mm or less, and that has environmental durability and a resistance to repeated stressing.

When manufacturing the planar light emitting device with this structure, after forming the through slit in the light guide, by arranging the light-blocking adhesive material that is provided with the hot melt layer and the light-blocking layer so as to cover the opening portion, and pushing this in the through slit with a hot press jig that has a convex portion, it is possible to form the light-blocking adhesive layer with a structure that reliably adheres to the switch sheet or the one face of the spacer thereon and the opening edge portion of the through slit by the hot melt layer. Thereby, there is the effect of being able to obtain the planar light emitting device that can exhibit the aforementioned superior working effect by a simple method.

Next, in the case of forming the through slit in the light guide, it is possible to adopt a method of irradiating laser light. Thereby, it is possible to easily form the through slit with an arbitrary shape in the light guide, which is advantageous for mass production.

As the hot press jig that is used in the method of manufacturing the planar light emitting device, when using a hot press jig that is provided with an auxiliary pressing portion on both sides of the convex portion, it is possible to reliably and easily achieve thermal adhesion by pressing the hot melt layer against the opening edge portion of the through slit, while simultaneously thermally bonding the hot melt layer to the one face side of the switch sheet or the spacer thereon by deformably pushing in the light-blocking adhesive material into the through slit with the convex portion while causing it to undergo thermal deformation. Accordingly, it is possible to achieve efficient mass production of a planar light emitting device that is provided with a light-blocking adhesive layer with high adhesive strength that is firmly bonded to the opening edge portion of the through slit and the one face of the switch sheet or the spacer thereon.

The embodiment of the present invention has a light-blocking layer consisting of an ink application over the opening edge portion and inner wall surface of the through slit that penetrates the light guide, and the front face of the switch sheet or the front face of the spacer thereon that is close to the inner wall surface. Since the light-blocking layer adheres to the opening edge portion of the through slit and the front face of the switch sheet or the front face of the spacer thereon, and covers the inner wall surface of the through slit, it is possible to minimize as much as possible the proportion of light that leaks to an adjacent region via the through slit. Moreover, it is possible to provide a structure in which light leakage hardly occurs to an adjacent region via the through slit portion. Also, by the structure according to the embodiment of the present invention, there is an effect of being able to prevent light leakage to the outside of the light guide from the through slit portion.

Also, since the light-blocking adhesive layer is provided in a state of a space being left in the through slit, it is possible to make a structure that has good heat dissipation by preventing heat from building up around the formation portion of the heat-blocking adhesive layer, and it is possible to make a structure in which there is little risk of discoloring or heat degradation in the light guide around the through slit portion. Moreover, with this structure, even if the light guide undergoes repeated thermal contraction and thermal expansion so as to narrow or widen the width of the through slit due to repeated thermal expansion of the light guide, causing repetitive stress to act on the light-blocking layer, since the light-blocking layer can readily deform in a direction that narrows or widens the space, it becomes a structure that is advantageous for stress cushioning.

Next, providing the light-blocking layer so as to fill the space between the through slit bottom portion of the light guide and the front face of the switch sheet or the front face of the spacer thereon closes the gap between the through slit bottom portion and the switch sheet or the gap between the through slit bottom portion and the spacer thereon. Accordingly, it is possible to inhibit the entry of dust to the switch sheet side via the through slit, it is possible to prevent the mixing in of foreign matter to the switch sheet side, and the dust control and waterproof performance are excellent. Thereby, even in the case of the planar light emitting device of the embodiment of the present invention being used over a long period, it is possible to provide a structure that can prevent the infiltration of dust to the switch sheet side, and that can prevent malfunctioning of the switch sheet.

Next, when the light-blocking layer is formed over the mutually facing opening edge portions and the inner wall surface of the through slit of the light guide and the front face of the switch sheet that is near thereto or the front face of the spacer thereon, and a recess portion is formed in the light-blocking layer on the inner side of the through slit, even in the case of a structure in which the light-blocking adhesive layer covers the mutually facing opening edge portions and the inner wall surface of the through slit of the light guide and the front face of the switch sheet or the front face of the spacer, even if the light guide undergoes repeated thermal contraction and thermal expansion so as to narrow or widen the width of the through slit due to repeated thermal expansion of the light guide, causing repetitive stress to act on the light-blocking layer, since the light-blocking layer can readily deform in a direction that narrows or widens the recess portion, it becomes a structure that is advantageous for stress cushioning.

For example, even in the case of undergoing repeated expansion and contraction due to keystrokes, since the light-blocking layer can easily deform to follow such expansion and contraction due to the presence of the recess portion, a structure results that is advantageous in terms of resistance to a repeated expansion and contraction action from keystrokes and the like.

When manufacturing the planar light emitting device with this structure, after forming the through slit in the light guide, by forming the light-blocking layer with an ink application by a dispenser so as to cover the opening portion of the through slit, it is possible to form the light-blocking layer with a structure that reliably adheres to the front face of the switch sheet or the front face of the spacer thereon and the opening edge portion of the through slit, and blocks light by covering the inner wall surface of the through slit.

Thereby, there is the effect of being able to obtain the planar light emitting device that can exhibit the aforementioned superior working effect by a simple method.

According to the planar light emitting device of the embodiments of the present invention, it is possible to reliably achieve selectively causing only specified operation keys to emit light, or selectively causing only specified operation keys not to emit light with a simple structure. Moreover, it is possible to provide a planar light emitting device and a method of manufacture thereof that enables good thermal diffusion around the light-blocking adhesive layer so that exfoliation of the light-blocking adhesive layer is hindered even if subjected to thermal stress arising from temperature changes of the environment, and accordingly hinders the occurrence of light leakage among regions that selectively emit light.

What is claimed is:

1. A planar light emitting device comprising:
   a light source;
   a sheet-like light guide that is arranged in the vicinity of the light source to guide light from the light source in a planar direction, and has a plurality of light emitting regions and a through slit that is formed between the light emitting regions to penetrate the light guide in a thickness direction;
   a switch sheet that is arranged so as to face one of a front face and a rear face of the light guide; and
   a light-blocking layer that has a flange portion that covers an opening edge portion of the through slit, a main body portion that covers at least one of the mutually facing inner wall surfaces of the through slit so as to form a space in an interior of the through slit and that continuous with the flange portion, and a bottom portion that is extended from a lower portion of the main body portion.

2. The planar light emitting device according to claim 1, wherein
   the bottom portion of the light-blocking layer is formed on the front face of the switch sheet that faces the through slit.

3. The planar light emitting device according to claim 1, further comprising a spacer that is formed between the through slit and the switch sheet,
   wherein the bottom portion of the light-blocking layer is formed on the front face of the spacer that faces the through slit.

4. The planar light emitting device according to claim 1, wherein
   the main body portion of the light-blocking layer is formed so as to cover both of the mutually facing inner wall surfaces of the through slit;
   the main body portion that is formed on the inner wall surface of both sides is continuous via the bottom portion of the light-blocking layer; and the space that is formed in the interior of the through slit is a recess portion that is surrounded by the main body portion that is formed on the inner wall surfaces of both sides and the bottom portion of the light-blocking layer.

5. The planar light emitting device according to claim 1, wherein
the width of the through slit is in a range of 0.1 mm to 1 mm.

6. The planar light emitting device according to claim 1, wherein
the bottom portion of the light-blocking layer fills a space between the bottom portion of the through slit and the switch sheet or a space between the bottom portion of the through slit and a spacer that is formed on the switch sheet.

7. The planar light emitting device according to claim 1, wherein
the light-blocking layer is formed by ink application.

8. The planar light emitting device according to claim 1, wherein
the light-blocking layer is bonded to the light guide and one of the switch sheet and a spacer that is formed on the switch sheet via a hot melt layer.

9. A method of manufacturing a planar light emitting device, comprising:
forming a through slit that penetrates a light guide in a thickness direction of the light guide;
affixing a switch sheet to one side among a front face and a rear face of the light guide; and
forming a light-blocking layer so as to be formed continuously over an opening edge portion of the through slit of the light guide and at least one of the mutually facing inner wall surfaces of the through slit, and so as to be further extended from a lower portion of the inner wall surface, while leaving a space in an interior of the through slit.

10. The method of manufacturing a planar light emitting device according to claim 9, wherein
forming the light-blocking layer by applying ink of a light-blocking material on the inside of the through slit with a dispenser from the outside of the opening portion of the through slit so as to extend over the opening edge portion of the through slit of the light guide, the inner wall surface, and the front face of the switch sheet that is near the inner wall surface.

11. The method of manufacturing a planar light emitting device according to claim 9, wherein
affixing the switch sheet to the light guide by inserting a spacer between the bottom portion of the through slit and the switch sheet; and
forming the light-blocking layer by applying ink of a light-blocking material on the inside of the through slit with a dispenser from the outside of the opening portion of the through slit so as to extend over the opening edge portion of the through slit of the light guide, the inner wall surface, and the front face of the spacer that is near the inner wall surface.

12. The method of manufacturing a planar light emitting device according to claim 9, wherein
arranging a light-blocking adhesive material that has a hot melt layer and a light-blocking layer at the opening portion of the through slit; and
forming the light-blocking layer by pushing in the light-blocking adhesive material while causing it to thermally deform from the outside of the opening portion using a hot press jig that has a convex portion corresponding to the width and depth of the through slit to bond the hot melt layer to the opening edge portion of the through slit of the light guide and the switch sheet.

13. The method of manufacturing a planar light emitting device according to claim 9, wherein
affixing the switch sheet to the light guide by inserting a spacer between the bottom portion of the through slit and the switch sheet;
arranging a light-blocking adhesive material that has a hot melt layer and a light-blocking layer at the opening portion of the through slit of the light guide; and
forming the light-blocking layer by pushing in the light-blocking adhesive material while causing it to thermally deform from the outside of the opening portion using a hot press jig that has a convex portion corresponding to the width and depth of the through slit to bond the hot melt layer to the opening edge portion of the through slit of the light guide and the spacer that is formed on the switch sheet.

14. The method of manufacturing a planar light emitting device according to claim 12, wherein
the hot press jig is provided with an auxiliary pressing portion on both sides in a width direction of the convex portion; and
forming a flange portion of the light-blocking layer that covers the opening edge portion of the through slit by pressing the light-blocking adhesive material that is positioned at the opening edge portion of the through slit with the auxiliary pressing portions in a state of the convex portion is inserted in the through slit.

15. The method of manufacturing a planar light emitting device according to claim 9, wherein
forming the light-blocking layer so as to cover both of the mutually facing inner wall surfaces of the through slit;
forming the light-blocking layer that covers both the inner wall surfaces so as to be continuous by the light-blocking layer that is further extended from the lower portion of the inner wall surfaces; and
forming a recess portion with the light-blocking layer that covers both of the inner wall surfaces and that are continuous via the light-blocking layer that is further extended from the lower portion of the inner wall surfaces.

* * * * *